United States Patent
Park

(10) Patent No.: US 12,045,426 B2
(45) Date of Patent: Jul. 23, 2024

(54) TOUCH DISPLAY DEVICE

(71) Applicant: LG Display Co., Ltd., Seoul (KR)

(72) Inventor: Je Hyung Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/062,960

(22) Filed: Dec. 7, 2022

(65) Prior Publication Data

US 2023/0185416 A1 Jun. 15, 2023

(30) Foreign Application Priority Data

Dec. 9, 2021 (KR) ........................ 10-2021-0175895

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 2203/04111* (2013.01); *G06F 2203/04112* (2013.01)

(58) Field of Classification Search
CPC ......... G06F 3/0445; G06F 2203/04111; G06F 2203/04112; G06F 3/0412; G06F 3/04164; G06F 3/0446; G06F 3/0448
See application file for complete search history.

(56) References Cited

U.S. PATENT DOCUMENTS

| | | | |
|---|---|---|---|
| 10,891,008 B2 | 1/2021 | Lee et al. | |
| 2016/0195984 A1* | 7/2016 | Bok | G06F 3/0446 |
| | | | 345/173 |
| 2019/0204953 A1* | 7/2019 | Min | G06F 3/04164 |
| 2019/0294278 A1* | 9/2019 | Kim | G06F 3/04164 |
| 2020/0089351 A1* | 3/2020 | Jeong | G06F 3/0448 |
| 2023/0152920 A1* | 5/2023 | He | G06F 3/044 |

FOREIGN PATENT DOCUMENTS

KR 20180131812 A 12/2018

* cited by examiner

*Primary Examiner* — Robin J Mishler
(74) *Attorney, Agent, or Firm* — Seed IP Law Group LLP

(57) ABSTRACT

The disclosure discloses a touch display device including a plurality of X-touch electrode lines extending in a first direction and receiving a touch driving signal, a plurality of Y-touch electrode lines extending in a second direction and transmitting a touch sensing signal, a plurality of X-touch lines extending in the second direction and transmitting the touch driving signal, and a plurality of touch contact holes electrically connecting the plurality of X-touch lines and the plurality of X-touch electrode lines to a plurality of X-touch electrodes.

25 Claims, 14 Drawing Sheets

TOUCH DISPLAY DEVICE

CROSS-REFERENCE TO RELATED APPLICATION

This application claims the benefit of Korean Patent Application No. 10-2021-0175895 filed on Dec. 9, 2021, which is hereby incorporated by reference as if fully set forth herein.

BACKGROUND

Technical Field

The disclosure relates to a touch display device, and more particularly to a touch display device capable of reducing a line resistance of a touch line, thereby enhancing touch sensing performance.

Description of the Related Art

With the progress of information-dependent society, various requirements for a display device for displaying an image are increasing. As such a display device, various display devices such as a liquid crystal display, an electroluminescent display, a quantum dot light emitting display, etc., are used.

Such a display device provides a function for recognizing finger touch or pen touch of a user on a display panel, and performing input processing based on the recognized touch.

For example, a touch display device capable of recognizing touch may include a plurality of touch electrodes disposed on or built in the display panel, and may detect whether or not there is touch of a user on the display panel, touch coordinates, etc., through driving of the touch electrodes.

The use range of such a touch display device is expanding not only to a mobile appliance such as a smartphone or a tablet computer, but also to a large-screen touch display device such as a display for an automobile, a display for exhibition, etc.

BRIEF SUMMARY

In a touch display device, when the number of touch lines connected to a touch electrode is increased in order to improve touch sensing performance, the area of the touch electrode is relatively reduced and, as such, there may be a problem in that the touch sensing performance is degraded.

Furthermore, as the length of the touch line increases, the line resistance of the touch line may be increased and, as such, there may be a problem in that touch sensitivity and touch sensing accuracy may be degraded.

One or more embodiments of the present disclosure addresses various technical problems in the related art including the technical problems identified above. Accordingly, the disclosure provides a touch display device One or more embodiments of the disclosure provide a touch display device achieving a reduction in line resistance of a touch line, thereby enhancing touch sensing performance.

Additional advantages and features of the disclosure will be set forth in part in the description which follows and in part will become apparent to those having ordinary skill in the art upon examination of the following or may be learned from practice of the disclosure. The technical benefits and other advantages of the disclosure may be realized and attained by the structure particularly pointed out in the written description and claims hereof as well as the appended drawings.

To achieve these benefits and other advantages and in accordance with the purpose of the disclosure, as embodied and broadly described herein, a touch display device may include a plurality of X-touch electrode lines extending in a first direction and receiving a touch driving signal, a plurality of Y-touch electrode lines extending in a second direction and transmitting a touch sensing signal, a plurality of X-touch lines extending in the second direction and transmitting the touch driving signal, and a plurality of touch contact holes electrically connecting the plurality of X-touch lines and the plurality of X-touch electrode lines to a plurality of X-touch electrodes.

Each of the X-touch electrode lines may include a mesh type touch electrode metal.

Each of the plurality of X-touch lines may be formed to have a double line structure of a top X-touch line and a bottom X-touch line, and the top X-touch line and the bottom X-touch line may be electrically interconnected via the plurality of touch contact holes.

The top X-touch line may be formed on the same layer as the X-touch electrode lines.

The bottom X-touch line may be disposed on the same layer as the Y-touch electrode lines.

At least one of the plurality of X-touch electrode lines may extend continuously in the first direction in one touch electrode area.

At least one of the plurality of X-touch electrode lines may be formed to have a structure opened in the first direction in one touch electrode area such that the at least one of the plurality of X-touch electrode lines does not overlap with the top X-touch line.

The at least one of the plurality of X-touch electrode lines may be formed to a structure opened in the second direction one or more times such that that the at least one of the plurality of X-touch electrode lines does not overlap with the top X-touch line.

The bottom X-touch line may extend continuously in the second direction.

The plurality of touch contact holes may be disposed at opposite areas with reference to the plurality of Y-touch electrode lines, to be misaligned from one another.

The plurality of touch contact holes, at which the plurality of X-touch lines are electrically connected to designated ones of the X-touch electrodes, respectively, may be formed such that a distance between the plurality of touch contact holes and the Y-touch electrode lines adjacent thereto is uniform.

Each of the plurality of X-touch electrode lines may include a shifted area in which the X-touch electrode line is shifted by a selected distance (or in some embodiments, predetermined distance).

The shifted distance of each of the plurality of X-touch electrode lines may correspond to a distance between adjacent ones of the X-touch lines.

The touch contact holes, at which the plurality of X-touch lines are electrically connected to designated ones of the X-touch electrodes, respectively, may be electrically connected to an X-touch electrode connection line at opposite sides of the Y-touch electrode lines.

The technical benefits of the embodiments disclosed in the disclosure are not limited to the above-described benefits, and other benefits which are not described herein may be derived by those skilled in the art from the following description of the embodiments of the disclosure.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

Figure 1:
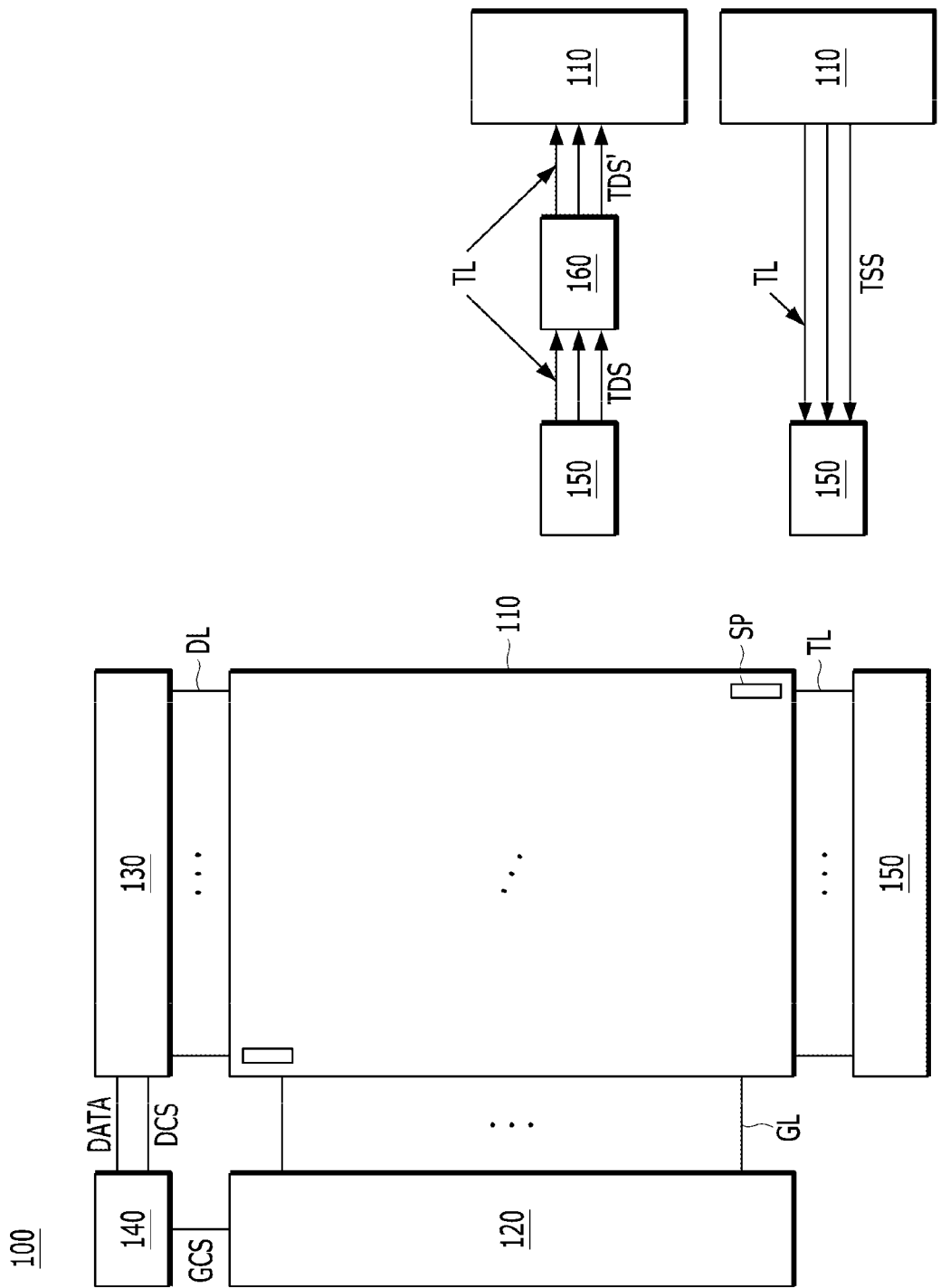
FIG. 1 is a block diagram showing a schematic configuration of a touch display device according to an example embodiment of the disclosure.

Advantages and features of the disclosure, and implementation methods thereof, will be clarified through the following embodiments described with reference to the accompanying drawings. However, the disclosure may be embodied in different forms and should not be construed as limited to the embodiments set forth herein. Rather, these embodiments are provided so that the disclosure will be thorough and complete, and will fully convey the scope of the disclosure to those skilled in the art.

A shape, a size, a ratio, an angle, and a number disclosed in the drawings for describing embodiments of the disclosure are merely an example, and thus, the disclosure is not limited to the illustrated details. The same reference numerals designate substantially the same elements throughout the specification. In the following description, when the detailed description of the relevant known function or configuration is determined to unnecessarily obscure the gist of the disclosure, the detailed description will be omitted. When "comprise," "have," and "include" described in the specification are used, another part may be added unless "only~" is used. Terms in a singular form may include plural forms unless stated otherwise.

In construing an element, the element is construed as including a tolerance range, even if there is no explicit description.

In describing a positional relationship between two elements, for example, when the positional relationship is described using "upon~," "above~," "below~," and "next to~," one or more other elements may be interposed between the two elements unless "just" or "directly" is used.

In describing a temporal relationship, for example, when the temporal order is described as "after~," "subsequent~," "next~," and "before~," the case which is not continuous may also be included unless "just" or "directly" is used.

In describing a signal flow relationship, for example, even in the case in which a signal is transferred from a node A to a node B, this case may include the case in which a signal is transferred from the node A to the node B via another node, unless "just" or "directly" is used.

It will be understood that, although the terms "first," "second," etc., may be used herein to describe various elements, these elements should not be limited by these terms. These terms are only used to distinguish one element from another. For example, a first element referred to in the following description may represent a second element, without departing from the scope of the disclosure.

The following embodiments may be partially or overall coupled or combined, and may be technically linked and implemented in various manners. The embodiments may be independently implemented, or may be implemented in a co-dependent relationship.

Hereinafter, various embodiments of the disclosure will be described in detail.

FIG. 1 is a block diagram showing a schematic configuration of a touch display device according to an example embodiment of the disclosure.

Referring to FIG. 1, a touch display device 100 according to an example embodiment of the disclosure may include a display panel 110, a gate driving circuit 120, a data driving circuit 130, a timing controller 140, and a touch driving circuit 150 configured to sense touch on the display panel 110.

A plurality of gate lines GL and a plurality of data lines DL are disposed at the display panel 110, and a plurality of sub-pixels SP may be disposed in areas where the gate lines GL and the data lines DL overlap each other.

In addition, a plurality of touch electrodes may be disposed on or built in the display panel 110, and a plurality of touch lines TL, which electrically interconnect the touch electrodes and the touch driving circuit 150, may be disposed at the display panel 110.

A configuration for display driving in the display device 100 will be first described. The gate driving circuit 120 controls driving timing of the sub-pixel SP disposed at the display panel 110. In addition, the data driving circuit 130 supplies a data voltage corresponding to image data to the sub-pixel SP. As a result, the sub-pixel SP emits light at a brightness corresponding to the grayscale of the image data and, as such, displays an image.

In detail, the gate driving circuit 120 is controlled by the timing controller 140, and sequentially outputs a scan signal to the plurality of gate lines GL disposed at the display panel 110, thereby controlling driving timing of the plurality of sub-pixels SP.

The gate driving circuit 120 may include one or more gate driving integrated circuits (GDICs), and may be disposed at only one side of the display panel 110 or at both sides of the display panel 110. Alternatively, the gate driving circuit 120 may be directly built in a bezel area of the display panel 110 and, as such, may be implemented in a gate-in-panel (GIP) type.

The data driving circuit 130 receives image data DATA having a digital form from the timing controller 140, and converts the image data DATA into a data voltage having an analog form. In addition, the data driving circuit 130 outputs data voltages to the data lines DL in accordance with timing of application of scan signals via the gate lines GL, respectively, thereby enabling the sub-pixels SP to represent brightness values according to the data voltages, respectively.

The data driving circuit 130 may include one or more source driving integrated circuits (SDICs).

The timing controller 140 supplies various control signals to the gate driving circuit 120 and the data driving circuit 130 and, as such, controls operations of the gate driving circuit 120 and the data driving circuit 130.

The timing controller 140 controls the gate driving circuit 120 to output a scan signal in accordance with timing implemented in each frame, converts image data DATA received from an exterior such that the image data is suitable for a data signal format used in the data driving circuit 130, and outputs the converted image data DATA to the data driving circuit 130.

The timing controller 140 receives, from the exterior (for example, a host system), various timing signals including a vertical synchronization signal, a horizontal synchronization signal, an input data enable signal, a clock signal, etc., together with the image data DATA.

The timing controller 140 may generate a data control signal DCS and a gate control signal GCS using the various timing signals received from the exterior, and may output the data control signal DCS and the gate control signal GCS to the data driving circuit 130 and the gate driving circuit 120, respectively.

For example, the timing controller 140 may output various gate control signals GCS including a gate start pulse, a gate shift clock, a gate output enable signal, etc., in order to control the gate driving circuit 120.

Here, the gate start pulse controls operation start timing of one or more gate driving integrated circuits constituting the gate driving circuit 120. The gate shift clock is a clock signal input in common to the one or more gate driving integrated circuits, and controls shift timing of a scan signal. The gate output enable signal designates timing information of the one or more gate driving integrated circuits.

In addition, the timing controller 140 outputs various data control signals DCS including a source start pulse, a source sampling clock, a source output enable signal, etc., in order to control the data driving circuit 130.

Here, the source start pulse controls data sampling start timing of one or more source driving integrated circuits constituting the data driving circuit 130. The source sampling clock is a clock signal for controlling sampling timing of data in each source driving integrated circuit. The source output enabling signal controls output timing of the data driving circuit 130.

The touch display device 100 as described above may further include a power management integrated circuit configured to supply various voltages or currents to the display panel 110, the gate driving circuit 120, the data driving circuit 130, the touch driving circuit 150, etc., or to control the various voltages or currents to be supplied.

Meanwhile, when an encapsulation layer is formed on the display panel 110, and a touch electrode is disposed on the encapsulation layer, the capacitance for driving of the touch electrode may increase. In this case, it may be beneficial to increase the level of a touch driving signal TDS for driving of the touch electrode. Accordingly, in some embodiments, a level shifter 160 may be added between the touch driving circuit 150 and the display panel 110 to control the level of the touch driving signal TDS.

In particular, since a display device for a vehicle has a larger screen than a mobile device, a load for transmitting a signal may be larger. Accordingly, the level shifter 160 receives the touch driving signal TDS, converts a signal level of the touch driving signal TDS into an amplified touch driving signal TDS', and then provides the amplified touch driving signal TDS' to touch electrodes TE on the display panel 110 by a plurality of touch lines TL. Also, a touch sensing signal TSS sensed through the touch electrodes TE may be transmitted to the touch driving circuit 150 without passing through the level shifter 160.

Figure 2:
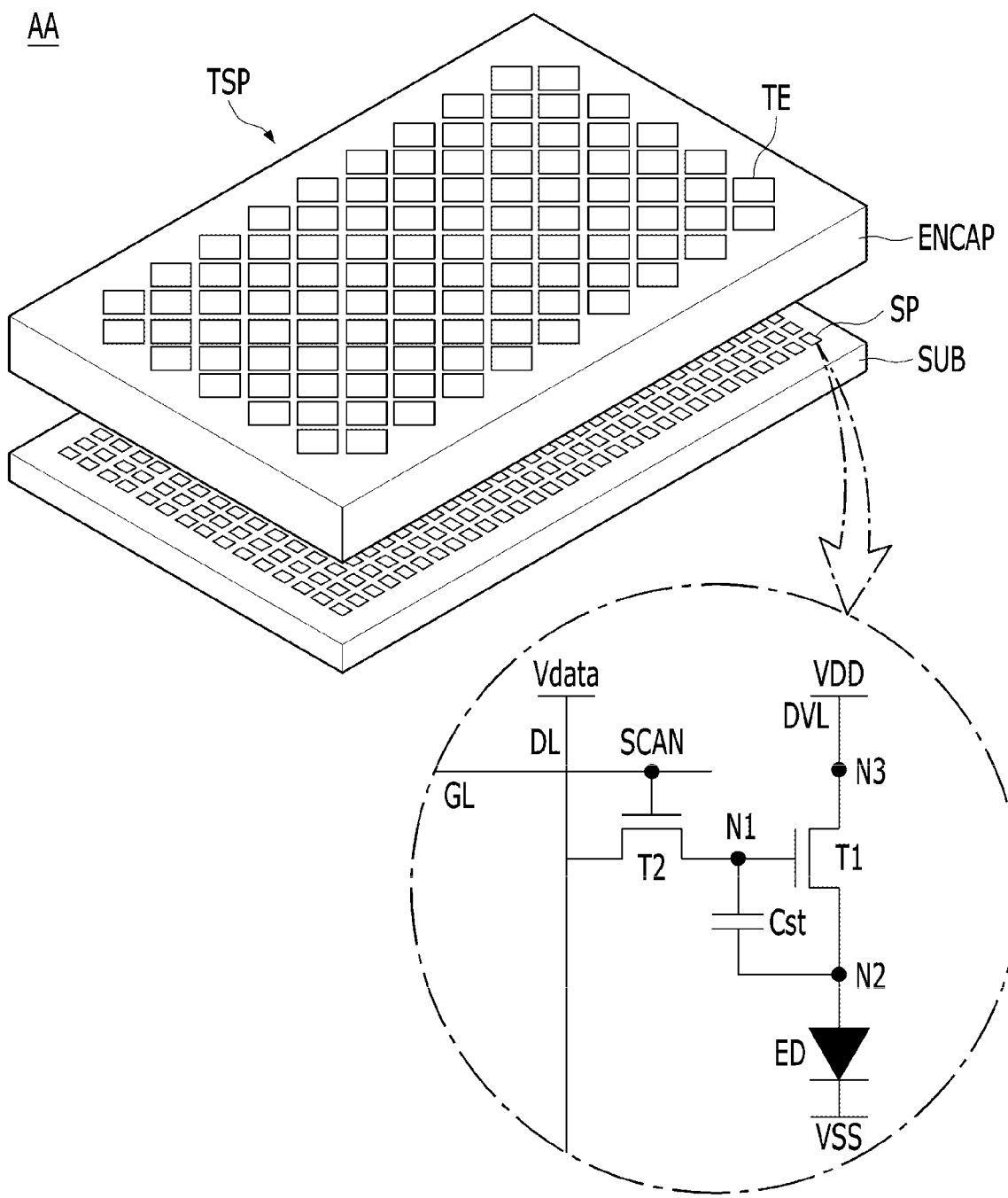
FIG. 2 is a view illustratively showing a structure in which a touchscreen panel is built in a display panel in a touch display device according to an example embodiment of the disclosure.

FIG. 2 is a view illustratively showing a structure in which a touchscreen panel is built in a display panel in a touch display device according to an example embodiment of the disclosure.

Referring to FIG. 2, in a touch display device 100 according to an example embodiment of the disclosure, a plurality of sub-pixels SP is arranged on a substrate SUB in a display area AA of a display panel 110.

Each sub-pixel SP may include a light emitting element ED, a first transistor T1 for driving the light emitting element ED, a second transistor T2 for transmitting a data voltage Vdata to a first node N1 of the first transistor T1, a storage capacitor Cst for maintaining a constant voltage for one frame, etc.

The first transistor T1 may include the first node N1, to which the data voltage Vdata is applied via the second transistor T2, a second node N2 electrically connected to the light emitting element ED, and a third node N3, to which a driving voltage VDD is applied from a driving voltage line DVL. The first node N1 is a gate node, the second node N2 may be a source node or a drain node, and the third node N3 may be a drain node or a source node. The first transistor T1 as described above may be referred to as a driving transistor for driving the light emitting element ED.

The light emitting element ED may include a first electrode (for example, an anode), a light emitting layer, and a second electrode (for example, a cathode). The first electrode may be electrically connected to the second node N2 of the first transistor T1, and a ground voltage VSS may be applied to the second electrode.

In the light emitting element ED as described above, the light emitting layer may be an organic light emitting layer including an organic material. In this case, the light emitting element ED may be an organic light emitting diode.

Turning-on/off of the second transistor T2 may be controlled by a scan signal SCAN applied to the second transistor T2 via a gate line GL, and the second transistor T2 may be electrically connected between the first node N1 of the first transistor T1 and a data line DL. The second transistor T2 as described above may be referred to as a switching transistor.

When the second transistor T2 is turned on by the scan signal SCAN, the data voltage Vdata supplied thereto via the data line DL is transmitted to the first node N1 of the first transistor T1.

The storage capacitor Cst may be electrically connected between the first node N1 and the second node N2 of the first transistor T1.

Each sub-pixel SP may have a 2T1C structure including two transistors T1 and T2 and one capacitor Cst. If necessary, each sub-pixel SP may further include one or more transistors, or may further include one or more capacitors.

The storage capacitor Cst may not be a parasitic capacitor, which may be present between the first node N1 and the second node N2 of the first transistor T1, but may be an external capacitor intentionally designed at an exterior of the first transistor T1.

Each of the first transistor T1 and the second transistor T2 may be an n-type or p-type transistor.

In addition, each of the first transistor T1 and the second transistor T2 may be constituted by a low-temperature polysilicon transistor. Of course, the example embodiments of the disclosure are not limited to the above-described condition, and at least one of the first transistor T1 and the second transistor T2 may be constituted by an oxide thin film transistor.

Meanwhile, a circuit element such as one light emitting element ED, two or more transistors T1 and T2, one or more capacitors Cst, etc., is provided. Since such a circuit element is weak against ambient moisture, oxygen or the like, an encapsulation layer ENCAP may be disposed on the display panel 110 in order to prevent ambient moisture or oxygen from penetrating the circuit element.

In the touch display device 100 according to the example embodiment of the disclosure, a touchscreen panel TSP may be formed on the encapsulation layer ENCAP and, as such, may be built in the display panel 110. That is, in the touch display device 100, a plurality of touch electrodes TE constituting the touchscreen panel TSP may be disposed on the encapsulation layer ENCAP, thereby constituting the display panel 110.

Figure 3:
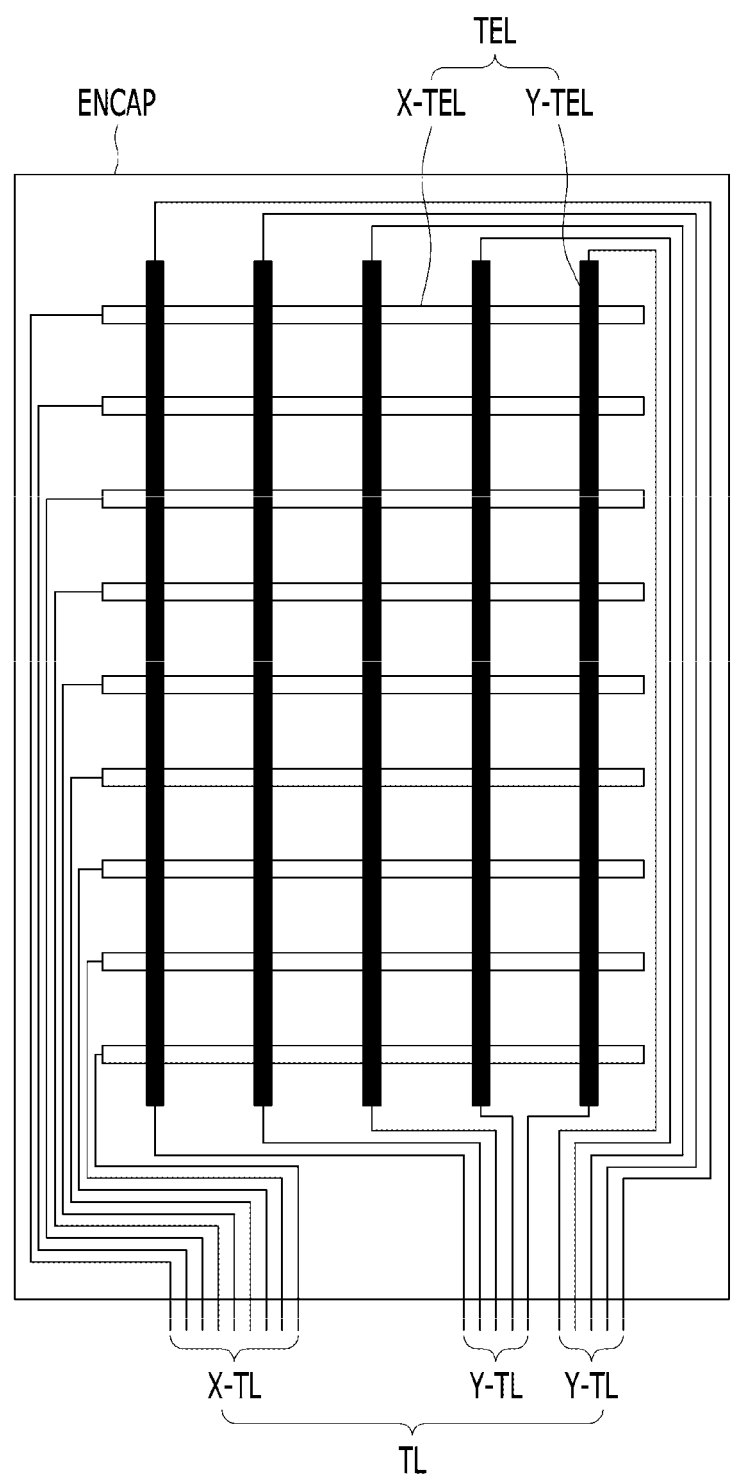
FIG. 3 is a diagram briefly showing a touch electrode structure for touch sensing based on mutual capacitance in a touch display device according to an example embodiment of the disclosure.

FIG. 3 is a diagram briefly showing a touch electrode structure for touch sensing based on mutual capacitance in a touch display device according to an example embodiment of the disclosure.

Referring to FIG. 3, in a touch display device 100 according to an example embodiment of the disclosure, a touch electrode structure thereof for touch sensing based on mutual capacitance may include a plurality of X-touch electrode lines X-TEL and a plurality of Y-touch electrode lines Y-TEL. In this case, the plurality of X-touch electrode lines X-TEL and the plurality of Y-touch electrode lines Y-TEL are disposed on an encapsulation layer ENCAP.

Each of the plurality of X-touch electrode lines X-TEL may be disposed to extend in a first direction, whereas each of the plurality of Y-touch electrode lines Y-TEL may be disposed to extend in a second direction different from the first direction.

In the disclosure, the first direction and the second direction may be directions relatively different from each other and, for example, the first direction may be an x-axis direction, and the second direction may be a y-axis direction. Conversely, the first direction may be the y-axis direction, and the second direction may be the x-axis direction. In addition, the first direction and the second direction may perpendicularly overlap each other or may not perpendicularly overlap each other. In addition, in the disclosure, a row and a column are relative to each other and, as such, may be interchanged in accordance with a viewing direction.

Each of the plurality of X-touch electrode lines X-TEL may be constituted by several X-touch electrodes that are electrically interconnected. Each of the plurality of Y-touch electrode lines Y-TEL may be constituted by several Y-touch electrodes that are electrically interconnected.

Here, the plurality of X-touch electrodes and the plurality of Y-touch electrodes are electrodes included in a plurality of touch electrodes TE while having functions distinguished from each other, respectively.

For example, the plurality of X-touch electrodes constituting each of the plurality of X-touch electrode lines X-TEL may be touch driving electrodes, whereas the plurality of Y-touch electrodes constituting each of the plurality of Y-touch electrode lines Y-TEL may be touch sensing electrodes. In this case, each of the plurality of X-touch electrode lines X-TEL corresponds to a touch driving electrode line, whereas each of the plurality of Y-touch electrode lines Y-TEL corresponds to a touch sensing electrode line.

Conversely, the plurality of X-touch electrodes constituting each of the plurality of X-touch electrode lines X-TEL may be touch sensing electrodes, whereas the plurality of Y-touch electrodes constituting each of the plurality of Y-touch electrode lines Y-TEL may be touch driving electrodes. In this case, each of the plurality of X-touch electrode lines X-TEL corresponds to a touch sensing electrode line, whereas each of the plurality of Y-touch electrode lines Y-TEL corresponds to a touch driving electrode line.

The touch electrode structure for touch sensing may include a plurality of touch lines TL in addition to the plurality of X-touch electrode lines X-TEL and the plurality of Y-touch electrode lines Y-TEL.

The plurality of touch lines TL may include one or more X-touch lines X-TL respectively connected to the plurality of X-touch electrode lines X-TEL, and one or more Y-touch lines Y-TL respectively connected to the plurality of Y-touch electrode lines Y-TEL.

Figure 4:
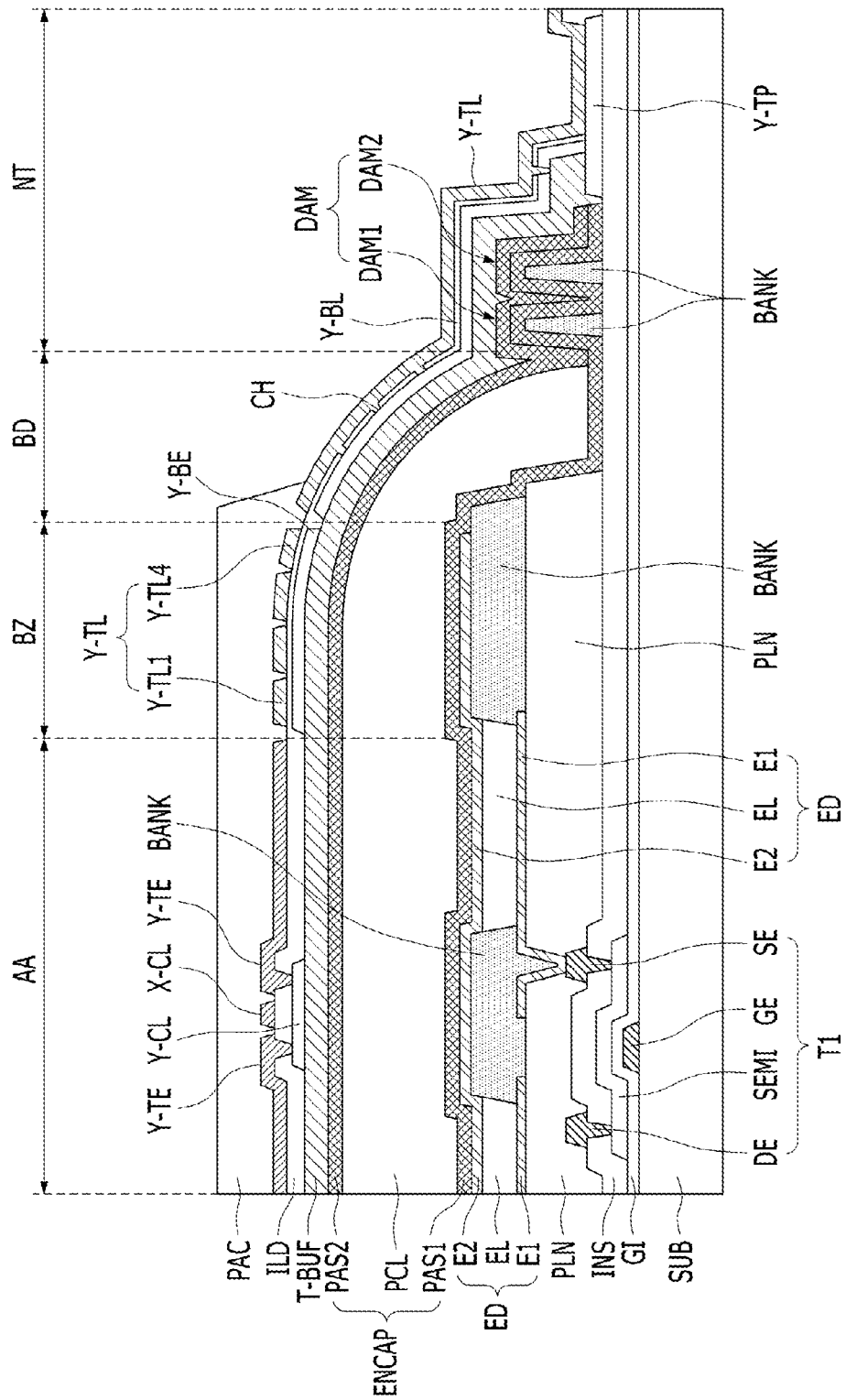
FIG. 4 is a view showing a cross-section of a touch display device according to an example embodiment of the disclosure.

FIG. 4 is a view showing a cross-section of a touch display device according to an example embodiment of the disclosure.

Although a Y-touch electrode Y-TE is shown in FIG. 4 as having a plate shape, this is only illustrative. The Y-touch electrode Y-TE may have a mesh shape.

Referring to FIG. 4, in a touch display device 100 according to an example embodiment of the disclosure, a first transistor T1, which is a driving transistor, may be disposed on a substrate SUB in a sub-pixel SP disposed in a display area AA.

The first transistor T1 may include a gate electrode GE, a source electrode SE, a drain electrode DE, and a semiconductor layer SEMI.

The gate electrode GE and the semiconductor layer SEMI may overlap each other under the condition that a gate insulating layer GI is interposed therebetween. The source electrode SE may be formed on an insulating layer INS such that the source electrode SE contacts one side of the semiconductor layer SEMI. The drain electrode DE may be formed on the insulating layer INS such that the drain electrode DE contacts the other side of the semiconductor layer SEMI.

A light emitting element ED may include a first electrode E1 corresponding to an anode (or a cathode), a light emitting layer EL formed on the first electrode E1, a second electrode E2 formed on the light emitting layer EL while corresponding to a cathode (or an anode), etc.

The first electrode E1 may be electrically connected to the source electrode SE of the first transistor T1 exposed through a contact hole extending through a planarization layer PLN.

The light emitting layer EL is formed on the first electrode E1 in a light emitting area provided by a bank BANK. The light emitting layer EL may be formed as a hole-related layer, a light emitting layer and an electron-related layer which are stacked in this order or in a reversed order. The second electrode E2 may be formed to face the first electrode E1 under the condition that the light emitting layer EL is interposed therebetween.

An encapsulation layer ENCAP prevents ambient moisture or oxygen from penetrating the light emitting element ED, which is weak against ambient moisture or oxygen. The encapsulation layer ENCAP may be constituted by a single layer or may be constituted by a plurality of stacked structures PAS1, PCL and PAS2.

For example, when the encapsulation layer ENCAP is constituted by the plurality of stacked structures PAS1, PCL and PAS2, the encapsulation layer ENCAP may include one or more inorganic encapsulation layers PAS1 and PAS2, and one or more organic encapsulation layers PCL. In a concrete example, in the encapsulation layer ENCAP, a first inorganic encapsulation layer PAS1, an organic encapsulation layer PCL, and a second inorganic encapsulation layer PAS2 may be stacked in this order.

In this case, the organic encapsulation layer PCL may further include at least one organic encapsulation layer or at least one inorganic encapsulation layer.

The first inorganic encapsulation layer PAS1 may be formed on the substrate SUB formed with the second electrode E2, which corresponds to the cathode, such that the first inorganic encapsulation layer PAS1 is most adjacent to the light emitting element ED. The first inorganic encapsulation layer PAS1 may be formed of an inorganic insulating material capable of being deposited at a low temperature, such as silicon nitride ($SiN_x$), silicon oxide ($SiO_x$), silicon oxynitride (SiON) or aluminum oxide ($Al_2O_3$). Since the first inorganic encapsulation layer PAS1 is deposited in a low-temperature atmosphere, the first inorganic encapsulation layer PAS1 may prevent the light emitting layer EL including an organic material weak against a high-temperature atmosphere from being damaged in a procedure in which a deposition process is performed.

The organic encapsulation layer PCL may be formed to have a smaller area than the first inorganic encapsulation layer PAS1. In this case, the organic encapsulation layer PCL may be formed to expose opposite ends of the first inorganic encapsulation layer PAS1. The organic encapsulation layer PCL may perform a buffering function for alleviating stress among layers caused by bending of the touch display device, which is an organic light emitting display device, and a function for enhancing planarization performance. The organic encapsulation layer PCL may be formed of, for example, an organic insulating material such as acryl resin, epoxy resin, polyimide, polyethylene or silicon oxycarbide (SiOC).

Meanwhile, when the organic encapsulation layer PCL is formed through an inkjet method, one, two or more dams DAM may be formed in a dam area corresponding to a boundary area between a non-display area and a display area AA or a portion of the non-display area.

For example, the dam area may be disposed between a pad area formed with a plurality of touch pads TP in the non-display area and the display area AA, and a primary dam DAM1 adjacent to the display area AA and a secondary dam DAM2 adjacent to the pad area may be present in the dam area.

The one or more dams DAM disposed in the dam area may prevent the organic encapsulation layer PCL, which is in a liquid state, from penetrating the pad area due to collapse thereof toward the non-display area when the liquid-state organic encapsulation layer PCL is stacked in the display area AA.

The primary dam DAM1 or the secondary dam DAM2 may be formed to have a single-layer structure or a multi-layer structure. For example, the primary dam DAM1 or the secondary dam DAM2 may be formed simultaneously with at least one of the bank BANK or a spacer (not shown) using the same material as the at least one of the bank BANK or the spacer. In this case, a dam structure may be formed without addition of a mask and an increase in cost.

In addition, the primary dam DAM1 or the secondary dam DAM2 may be formed to have a structure in which the first inorganic encapsulation layer PAS1 and the second inorganic encapsulation layer PAS2 are stacked on the bank BANK. In this case, the organic encapsulation layer PCL, which includes an organic material, may be disposed at an inner side surface of the primary dam DAM1 or may be disposed over at least a portion of the primary dam DAM1 and the secondary dam DAM2.

The second inorganic encapsulation layer PAS2 may be formed on the substrate SUB formed with the organic encapsulation layer PCL, to cover an upper surface and a side surface of each of the organic encapsulation layer PCL and the first inorganic encapsulation layer PAS1. The second encapsulation layer PAS2 minimizes or prevents penetration of ambient moisture or oxygen into the first inorganic encapsulation layer PAS1 and the organic encapsulation layer PCL. The second inorganic encapsulation layer PAS2 as described above may be formed of an inorganic insulating material such as silicon nitride ($SiN_x$), silicon oxide ($SiO_x$), silicon oxynitride (SiON) or aluminum oxide ($Al_2O_3$).

A touch buffer layer T-BUF may be disposed on the encapsulation layer ENCAP. The touch buffer layer T-BUF may be disposed between a touch sensor metal, which includes touch electrodes X-TE and Y-TE and touch electrode connection lines X-CL and Y-CL, and the second electrode E2 of the light emitting element ED.

The touch buffer layer T-BUF may be designed such that the distance between the touch sensor metal and the second electrode E2 of the light emitting element ED is maintained to be a selected distance (or in some embodiments, predetermined distance) (for example, 1 μm). Accordingly, it may be possible to reduce or prevent formation of parasitic capacitance between the touch sensor metal and the second electrode E2 of the light emitting element ED and, as such, to prevent degradation of touch sensitivity caused by the parasitic capacitance.

On the other hand, the touch sensor metal, which includes the touch electrodes X-TE and Y-TE and the touch electrode connection lines X-CL and Y-CL, may be disposed on the encapsulation layer ENCAP without interposition of the touch buffer layer T-BUF as described above.

In addition, the touch buffer layer T-BUF may prevent a chemical liquid (a developer, an etchant, or the like) used in a process of forming the touch sensor metal on the touch buffer layer T-BUF from penetrating the light emitting layer EL including an organic material. Accordingly, the touch buffer layer T-BUF may prevent damage to the light emitting layer EL weak against a chemical liquid or moisture.

The touch buffer layer T-BUF may be formed of an organic insulating material having a low dielectric constant and capable of being formed at a low temperature equal to or lower than a predetermined temperature (for example, 100° C.) in order to prevent damage to the light emitting layer EL including an organic material weak against a high temperature. For example, the touch buffer layer T-BUF may be formed of an acryl-based material, an epoxy-based material or a siloxane-base material. The touch buffer layer T-BUF, which has a planarization performance in accordance with use of an organic insulating material, may prevent damage to the inner layers PAS1, PCL and PAS2 constituting the encapsulation layer ENCAP and a breakage phenomenon of the touch sensor metal formed on the touch buffer layer T-BUF caused by bending of the organic light emitting display device.

In a mutual capacitance-based touch sensing structure, an X-touch electrode line X-TEL and a Y-touch electrode line Y-TEL may be disposed on the touch buffer layer T-BUF, and the X-touch electrode line X-TEL and the Y-touch electrode line Y-TEL may be disposed to overlap each other. The Y-touch electrode line Y-TEL may include a plurality of Y-touch electrode connection lines Y-CL electrically interconnecting a plurality of Y-touch electrodes Y-TE.

In this case, the plurality of Y-touch electrodes Y-TE and the plurality of Y-touch electrode connection lines Y-CL may be disposed on different layers, respectively, under the condition that an interlayer dielectric material ILD is interposed therebetween.

The plurality of Y-touch electrodes Y-TE may be spaced apart from one another by a uniform distance in a y-axis direction. Each of the plurality of Y-touch electrodes Y-TE may be electrically connected to another Y-touch electrode Y-TE adjacent thereto in the y-axis direction via a Y-touch electrode connection line Y-CL.

The Y-touch electrode connection line Y-CL may be formed on the touch buffer layer T-BUF while being exposed through touch contact holes extending through the interlayer dielectric material ILD and, as such, may be electrically connected to two Y-touch electrodes Y-TE, which are adjacent to each other in the y-axis direction.

The Y-touch electrode connection line Y-CL may be disposed to overlap with the bank BANK. Accordingly, a decrease in aperture ratio caused by the Y-touch electrode connection line Y-CL may be prevented.

The X-touch electrode line X-TEL may include a plurality of X-touch electrode connection lines X-CL electrically interconnecting a plurality of X-touch electrodes X-TE. The plurality of X-touch electrodes X-TE and the plurality of X-touch electrode connection lines X-CL may be disposed on different layers, respectively, under the condition that the interlayer dielectric material ILD is interposed therebetween.

The plurality of X-touch electrodes X-TE may be spaced apart from one another by a uniform distance in an x-axis direction. Each of the plurality of X-touch electrodes X-TE may be electrically connected to another X-touch electrode X-TE adjacent thereto in the x-axis direction via an X-touch electrode connection line X-CL.

Alternatively, the X-touch electrode connection line X-CL may be disposed on the same plane as the X-touch electrodes X-TE and, as such, may be electrically connected to two X-touch electrodes X-TE adjacent in the x-axis direction without a separate contact hole, or may be integrated with the two X-touch electrodes X-TE adjacent in the x-axis direction.

The X-touch electrode connection line X-CL may be disposed to overlap with the bank BANK. Accordingly, a decrease in aperture ratio caused by the X-touch electrode connection line X-CL may be prevented.

Meanwhile, the Y-touch electrode line Y-TEL may be electrically connected to a touch driving circuit 150 via a Y-touch line Y-TL and a Y-touch pad Y-TP. Similarly, the X-touch electrode line X-TEL may be electrically connected to the touch driving circuit 150 via an X-touch line X-TL and an X-touch pad X-TP.

In this case, a pad cover electrode covering the X-touch pad X-TP and the Y-touch pad Y-TP may further be disposed.

The X-touch pad X-TP may be formed separately from the X-touch line X-TL, or may be formed through extension of the X-touch line X-TL. The Y-touch pad Y-TP may be formed separately from the Y-touch line Y-TL, or may be formed through extension of the Y-touch line Y-TL.

When the X-touch pad X-TP is formed to extend from the X-touch line X-TL, and the Y-touch pad Y-TP is formed to extend from the Y-touch line Y-TL, all of the X-touch pad X-TP, the X-touch line X-TL, the Y-touch pad Y-TP and the Y-touch line Y-TL may be constituted by a first conductive material. Here, the first conductive material may be formed to have a single-layer structure or a multilayer structure using, for example, a metal having strong corrosion resistance, strong acid resistance and excellent conductivity, such as Al, Ti, Cu, or Mo.

For example, the X-touch pad X-TP, the X-touch line X-TL, the Y-touch pad Y-TP and the Y-touch line Y-TL may be formed to have a stacked triple-layer structure of, for example, Ti/Al/Ti or Mo/Al/Mo.

The pad cover electrode, which may cover the X-touch pad X-TP and the Y-touch pad Y-TP, may be constituted by a second conductive material identical to the material of the X and Y-touch electrodes X-TE and Y-TE. Here, the second conductive material may be a transparent conductive material having strong corrosion resistance and strong acid resistance, such as indium tin oxide (ITO) or indium zinc oxide (IZO). The pad cover electrode as described above may be formed to be exposed by the touch buffer layer T-BUF and, as such, may be bonded to the touch driving circuit 150 or to a circuit film on which the touch driving circuit 150 is mounted.

In this case, the touch buffer layer T-BUF may be formed to cover the touch sensor metal, thereby prevent the touch sensor metal from being eroded by ambient moisture or the like. For example, the touch buffer layer T-BUF may be formed of an organic insulating material or may be formed in the form of a circular polarization plate or a film made of an epoxy or acryl material. The touch buffer layer T-BUF may not be present on the encapsulation layer ENCAP. That is, the touch buffer layer T-BUF may not be an essential constituent element.

The Y-touch line Y-TL may be electrically connected to the Y-touch electrode Y-TE via a touch line contact hole or may be integrated with the Y-touch electrode Y-TE.

The Y-touch line Y-TL as described above may extend to the non-display area and, as such, may be electrically connected to the Y-touch pad Y-TP while extending beyond an upper portion and a side surface of the encapsulation layer ENCAP and an upper portion and a side surface of the dam DAM. Accordingly, the Y-touch line Y-TL may be electrically connected to the touch driving circuit 150 via the Y-touch pad Y-TP.

The Y-touch line Y-TL may transmit the touch sensing signal TSS from the Y-touch electrode Y-TE to the touch driving circuit 150, or may receive the touch driving signal TDS from the touch driving circuit 150 and may transmit the received touch driving signal to the Y-touch electrode Y-TE.

In this case, a Y-touch bridge line Y-BL may be disposed under the Y-touch line Y-TL in a notch area NT and the bending area BD such that the Y-touch bridge line Y-BL is connected to the Y-touch line Y-TL via a contact hole CH. Since the Y-touch line Y-TL and the Y-touch bridge line Y-BL are electrically interconnected via one or more contact holes CH formed to be spaced apart from one another by a uniform distance, the same touch driving signal TDS or the same touch sensing signal TSS may be transmitted thereto.

When the Y-touch line Y-TL and the Y-touch bridge line Y-BL are electrically interconnected, as described above, it may be possible to reduce electrical resistance in a procedure of transmitting a touch driving signal TDS or a touch sensing signal TSS. In addition, when the Y-touch line Y-TL and the Y-touch bridge line Y-BL are interconnected via a plurality of contact holes CH, a touch signal (a touch driving signal TDS or a touch sensing signal TSS) may be bypassed via a contact hole CH even when disconnection occurs at a portion of the Y-touch line Y-TL or the Y-touch bridge line Y-BL and, as such, a desired touch sensing performance may be secured.

The Y-touch line Y-TL and the Y-touch bridge line Y-BL may be insulated at portions thereof other than the contact hole CH by the interlayer dielectric material ILD disposed therebetween.

Meanwhile, a plurality of Y-touch lines Y-TL1, Y-TL2, Y-TL3 and Y-TL4 may be disposed in a bezel area BZ, and a Y-touch bridge electrode Y-BE having an integrated structure may be disposed thereunder.

The Y-touch bridge electrode Y-BE, which has an integrated structure, may be formed to have a width equal to or greater than that of the Y-touch lines Y-TL1, Y-TL2, Y-TL3 and Y-TL4 disposed thereover, in order to cover the area occupied by the Y-touch lines Y-TL1, Y-TL2, Y-TL3 and Y-TL4. In one embodiment, as shown in FIG. 4, the Y-touch bridge electrode Y-BE is disposed under and overlaps with the Y-touch lines Y-TL1, Y-TL2, Y-TL3 and Y-TL4 in the bezel area BZ.

In this case, the Y-touch bridge electrode Y-BE is connected to a ground voltage GND in order to discharge a noise charge entering the display panel 110, and is isolated from the Y-touch bridge line Y-BL disposed in the bending area BD.

As such, a noise charge entering the display panel 110 may be easily discharged to a terminal for the ground voltage GND by the Y-touch bridge electrode Y-BE formed to have an integrated structure so as to cover the area occupied by the Y-touch lines Y-TL1, Y-TL2, Y-TL3 and Y-TL4. Accordingly, it may be possible to enhance the touch sensing performance of the touch display device 100 and to reduce failure occurring during driving of the touch display device 100.

Meanwhile, the X-touch line X-TL may be electrically connected to the X-touch electrode X-TE via a touch line contact hole or may be integrated with the X-touch electrode X-TE.

The X-touch line X-TL as described above may extend to the non-display area and, as such, may be electrically connected to the X-touch pad X-TP while extending beyond the upper portion and the side surface of the encapsulation layer ENCAP and the upper portion and the side surface of the dam DAM. Accordingly, the X-touch line X-TL may be electrically connected to the touch driving circuit 150 via the X-touch pad X-TP.

The X-touch line X-TL may receive the touch driving signal TDS from the touch driving circuit 150 and may transmit the received touch driving signal TDS to the X-touch electrode X-TE, or may transmit the touch sensing signal TSS from the X-touch electrode X-TE to the touch driving circuit 150.

Disposition of the X-touch line X-TL and the Y-touch line Y-TL may be diversely varied in accordance with a design factor of the display panel 110.

Meanwhile, a touch protective layer PAC may be disposed over the X-touch electrode X-TE and the Y-touch electrode Y-TE. The touch protective layer PAC may extend to a front portion or a back portion of the dam DAM and, as such, may be disposed even on the X-touch line X-TL and the Y-touch line Y-TL.

Meanwhile, the cross-sectional view shown in FIG. 4 conceptually shows the structure of the touch display device 100. Positions, thicknesses or widths of respective patterns (various layers or various electrodes) may be varied in accordance with a viewing direction or position, connection structures of various patterns may be varied, an additional layer may further be present in addition to the shown several layers, and a part of the shown several layers may be omitted or integrated. For example, the width of the bank BANK may be smaller than the width shown in FIG. 4, and the height of the dam DAM may be smaller or greater than the height shown in FIG. 4.

The touch display device 100 may be used in a mobile appliance such as a smartphone or a tablet computer, or the like. However, the touch display device 100 according to one or more embodiments of the present disclosure is particularly beneficial for being used in a large-screen display device such as a display for an automobile, a display for exhibition or the like.

However, when the number of touch lines TL connected to the touch electrode TE is increased in order to enhance the touch sensing performance of the touch display device 100, the area of the touch electrode TE is relatively reduced and, as such, there is a problem in that the touch sensing performance is degraded.

In addition, as the length of the touch line TL increases, the parasitic capacitance caused by coupling between the touch line TL and the touch electrode TE may be increased and, as such, there is a problem in that touch sensitivity and accuracy of touch sensing may be degraded.

In particular, since a display device for a vehicle (e.g., automobile) generally has a larger screen compared to a mobile device, an area or number of the touch electrodes TE and the touch lines TL in the touch display device 100 may be increased. In a case of a large screen as described above, a load for transmitting a touch signal also increases, and the touch sensing performance may be deteriorated.

In addition, a display device for a vehicle such as an instrument panel or a dashboard has a long length according to an X-direction and a short length according to a Y-direction, thus a width of the display device for the vehicle may be different from a height unlike a mobile device. In the display device for the vehicle that is configured with a large screen than a mobile device and to have a long width and a short height, the configuration of the present disclosure may be beneficial to maintain a touch sensing performance at a same level as that of the mobile device or to further improve the touch sensing performance.

In other words, a display device generally used in an automobile tends to have a width that is relatively greater than a height (e.g., a landscape orientation) and is fixed to the automobile (usually adjacent to the instrument panel of the automobile), whereas a mobile device tends to have a height that is relatively greater than a width to fit a user's hand (e.g., a portrait orientation; although the user is not limited in any way and may freely rotate the mobile device to view it in a landscape orientation). Due to this configuration differences, it is beneficial for the touch configuration of a display panel used in the automobile to have a different touch configuration of a display panel of a mobile device.

A touch display device 100 according to an example embodiment of the disclosure may apply a multi-feeding structure in which touch lines TL are alternately arranged. In this case, it may be possible to reduce the number of the touch lines TL, and a desired area of the touch electrode TE may be secured. Accordingly, an enhancement in touch sensing performance may be achieved.

Figure 5:
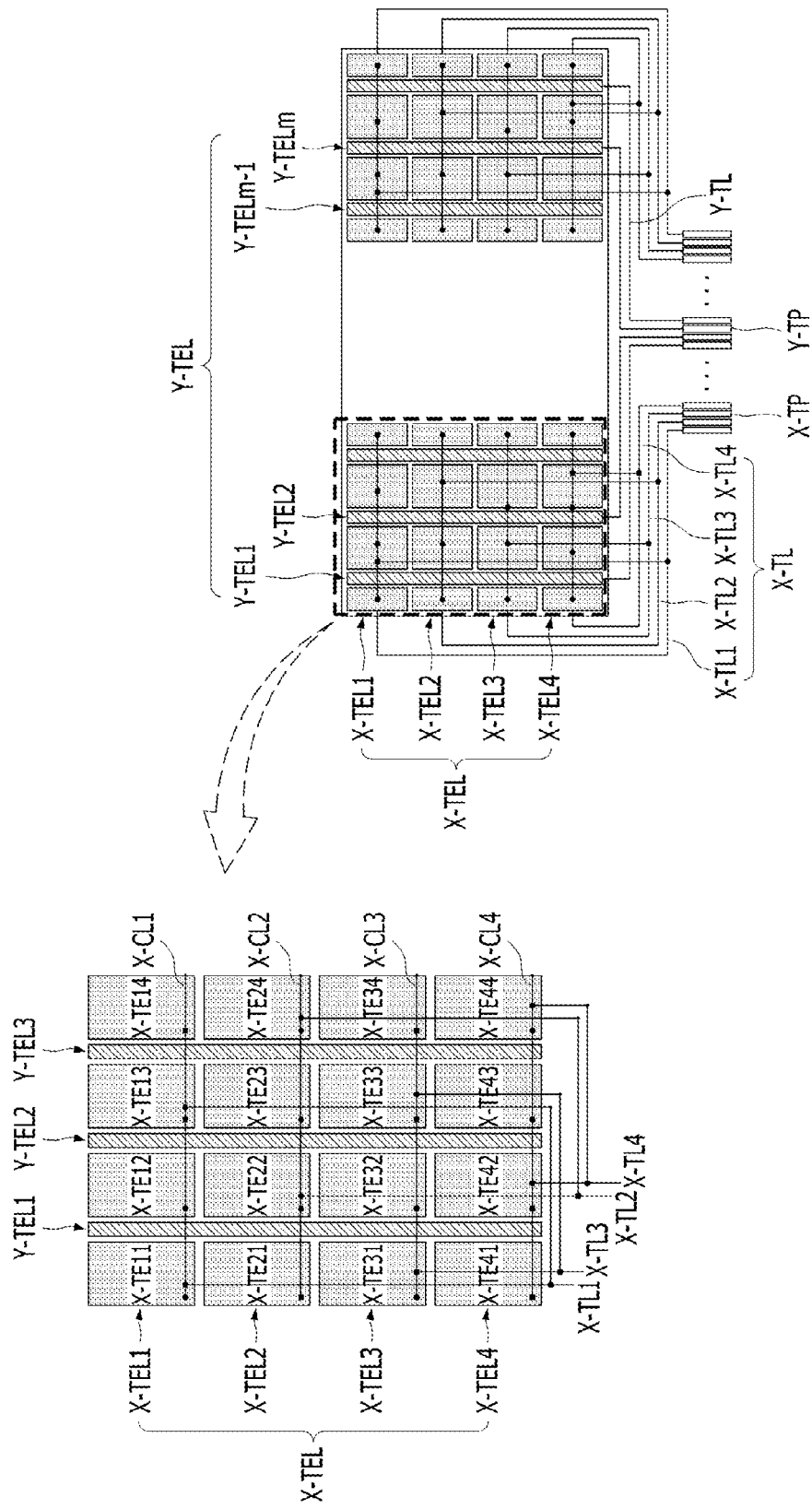
FIG. 5 is a view illustratively showing a display panel having a multi-feeding structure, in which a touch signal is simultaneously applied to a plurality of touch electrodes disposed on the same line, in a touch display device according to an example embodiment of the disclosure.

FIG. 5 is a view illustratively showing a display panel having a multi-feeding structure, in which a touch signal is simultaneously applied to a plurality of touch electrodes disposed on the same line, in a touch display device according to an example embodiment of the disclosure.

Referring to FIG. 5, in a touch display device 100 according to an example embodiment of the disclosure, a touch line may be configured to have a multi-feeding structure such that a touch signal is simultaneously applied to a plurality of touch electrodes constituting the same touch electrode line TEL, for reduction of temporal delay of the touch signal.

In this case, when a plurality of X-touch electrodes arranged in an x-axis direction constitute one X-touch electrode line X-TEL, the plurality of X-touch electrodes constituting one X-touch electrode line X-TEL may be interconnected by an X-touch electrode connection line X-CL, and a plurality of X-touch electrodes disposed on the same line may be interconnected by the same X-touch line X-TL, in order to enable a touch signal to be simultaneously applied to the plurality of X-touch electrodes constituting one X-touch electrode line X-TEL.

Alternatively, when a plurality of Y-touch electrodes arranged in a y-axis direction constitute one Y-touch electrode line Y-TEL, a plurality of Y-touch electrodes disposed on the same line may be interconnected by the same Y-touch line Y-TL, in order to enable a touch signal to be simultaneously applied to the plurality of Y-touch electrodes constituting one Y-touch electrode line Y-TEL.

Here, the case in which each x-axis directional X-touch electrode line X-TEL is constituted by a plurality of X-touch electrodes, and each y-axis directional Y-touch electrode line Y-TEL is constituted by one Y-touch electrode is illustratively shown. In this case, accordingly, a plurality of X-touch electrodes arranged in the same row in the x-axis direction may be interconnected by the same X-touch line X-TL.

For example, a first-row X-touch electrode line X-TEL1 is constituted by a plurality of X-touch electrodes disposed in a first row, and the plurality of X-touch electrodes disposed in the first row is electrically connected to a first X-touch line X-TL1 having a branched structure and, as such, a first touch signal may be simultaneously transmitted to the plurality of X-touch electrodes.

As a touch signal is simultaneously applied to a plurality of X-touch electrodes disposed in the x-axis direction, as described above, delay of the touch signal for the plurality of X-touch electrodes may be reduced and, as such, the touch performance of the entire screen of the display panel 110 may be uniformized.

For example, when each of the plurality of X-touch electrodes disposed in the x-axis direction is a touch driving electrode, the plurality of X-touch electrodes constituting one X-touch electrode line X-TEL may be electrically interconnected by the same X-touch line X-TL and, as such, the same touch driving signal TDS may be applied to the plurality of X-touch electrodes at the same timing.

A plurality of X-touch electrode lines X-TEL1, . . . , and X-TELn may be electrically connected to corresponding ones of X-touch pads X-TP via X-touch lines X-TL1, . . . , and X-TLn, respectively. For example, a plurality of X-touch electrodes included in a first X-touch electrode line X-TEL1 may be electrically connected to the corresponding X-touch pad X-TP via a first X-touch line X-TL1.

On the other hand, since Y-touch electrode lines Y-TEL1, . . . , and Y-TELm are each constituted by one Y-touch electrode, each of the Y-touch electrode lines Y-TEL1, . . . , and Y-TELm may be electrically connected to a corresponding Y-touch pad Y-TP via one Y-touch line Y-TL.

In this case, the structure in which one touch line is branched in order to connect the touch line to a plurality of touch electrodes constituting the same touch electrode line TEL may be diversely varied.

Meanwhile, the X-touch line X-TL connected to the X-touch electrodes X-TE disposed in each row may be alternately arranged in plural.

Referring to FIG. 5, in the touch display device 100 according to the example embodiment of the disclosure, X-touch lines X-TL or Y-touch lines Y-TL are alternately arranged and, as such, it may be possible to reduce the number of touch lines TL and to secure a desired area of a touch electrode TE.

The following description will be given in conjunction with, for example, a mutual capacitance-based touch sensing structure in which touch electrodes TE11 to TE44 are arranged in a 4×4 matrix.

In the mutual capacitance-based touch sensing structure, X-touch electrode lines X-TEL and Y-touch electrode lines Y-TEL may be disposed to overlap each other.

For example, a first X-touch electrode line X-TEL1 may be constituted by a first-row first-column X-touch electrode X-TE11, a first-row second-column X-touch electrode X-TE12, a first-row third-column X-touch electrode X-TE13, and a first-row fourth-column X-touch electrode X-TE14.

In this case, X-touch electrodes X-TE11, X-TE12, X-TE13 and X-TE14 disposed in the first row may be interconnected in the x-axis direction by a first X-touch electrode connection line X-CL1. Accordingly, a touch signal transmitted through a part of the X-touch electrodes X-TE11, X-TE12, X-TE13 and X-TE14 disposed in the first row may be transmitted to all of the X-touch electrodes X-TE11, X-TE12, X-TE13 and X-TE14 disposed in the first row by the first X-touch electrode connection line X-CL1.

In addition, X-touch electrodes X-TE21, X-TE22, X-TE23 and X-TE24 disposed in the second row may be interconnected in the x-axis direction by a second X-touch electrode connection line X-CL2. Accordingly, a touch signal transmitted through a part of the X-touch electrodes X-TE21, X-TE22, X-TE23 and X-TE24 disposed in the second row may be transmitted to all of the X-touch electrodes X-TE21, X-TE22, X-TE23 and X-TE24 disposed in the second row by the second X-touch electrode connection line X-CL2.

In this case, X-touch lines X-TL1, X-TL2, X-TL3, and X-TL4 extending in a y-axis direction may be alternately arranged and, as such, may be connected to the X-touch electrodes X-TE11 to X-TE44.

For example, among the X-touch electrodes X-TE11, X-TE21, X-TE31 and XTE41 disposed in the first column, the first-row first-column X-touch electrode X-TE11 is connected to the first X-touch line X-TL1, and the third-row first-column X-touch electrode X-TE31 is connected to the third X-touch line X-TL3.

On the other hand, the second-row first-column X-touch electrode X-TE21 and the fourth-row first-column X-touch electrode X-TE41 are not directly connected to any X-touch line X-TL.

However, since the first-row X-touch electrodes X-TE11, X-TE12, X-TE13 and XTE14 are connected in the x-axis direction by the first-row X-touch electrode connection line X-CL1, a touch signal transmitted via the first X-touch line X-TL1 may be transmitted to all of the first-row X-touch electrodes X-TE11, X-TE12, X-TE13 and XTE14.

Similarly, the third-row X-touch electrodes X-TE31, X-TE32, X-TE33 and XTE34 are connected in the x-axis direction by the third-row X-touch electrode connection line X-CL3 and, as such, a touch signal transmitted via the third X-touch line X-TL3 may be transmitted to all of the third-row X-touch electrodes X-TE31, X-TE32, X-TE33 and XTE34.

Thus, it may be possible to transmit a touch signal by disposing only two X-touch lines X-TL1 and X-TL3 in an area where the four X-touch electrodes X-TE11, X-TE21, X-TE31 and XTE41 in the first column are disposed and, as such, to reduce the number of touch lines TL.

In this case, among the X-touch electrodes X-TE12, X-TE22, X-TE32 and XTE42 disposed in the second column, the second-row second-column X-touch electrode X-TE22 is connected to the second X-touch line X-TL2, and the fourth-row second-column X-touch electrode X-TE42 is connected to the fourth X-touch line X-TL4. On the other hand, the first-row second-column X-touch electrode X-TE12 and the third-row second-column X-touch electrode X-TE32 are not directly connected to any X-touch line X-TL.

Figure 9A:
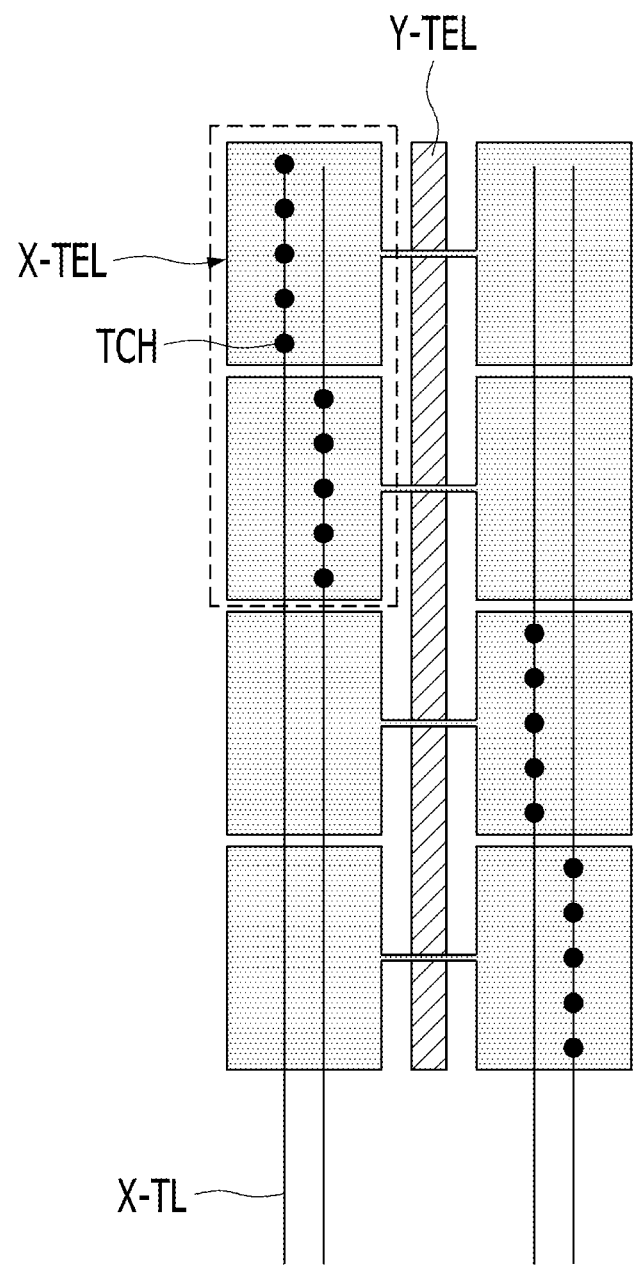
FIG. 9A is a view illustratively showing connection of an X-touch line formed to have a double line structure in a touch display device.

Accordingly, connection points of the X-touch lines X-TL1 and X-TL3 connected to the first column X-touch electrodes corresponding to a left area with reference to the first Y-touch electrode line Y-TEL1 may be disposed to be not aligned with (or misaligned from) connection points of the X-touch lines X-TL2 and X-TL4 connected to the second column X-touch electrodes corresponding to a right area with reference to the first Y-touch electrode line Y-TEL1. In other words, as shown in FIG. 9A, the plurality of touch contact holes TCH are not arranged symmetrically with respect to the Y-touch electrode line Y-TEL. For instance, the plurality of touch contact holes TCH on the upper left side of FIG. 9A (as shown) and the plurality of touch contact holes TCH on the lower right side of FIG. 9A (as shown) are not symmetrically arranged with reference to the Y-touch electrode line Y-TEL.

As a result, it may be possible to transmit a touch signal by disposing only two X-touch lines X-TL2 and X-TL4 in an area where the four X-touch electrodes X-TE12, X-TE22, X-TE32 and XTE42 in the second column are disposed and, as such, to reduce the number of touch lines TL.

Meanwhile, for X-touch electrodes X-TE13, X-TE23, X-TE33 and X-TE43 disposed in the third column, X-touch lines X-TL may be connected thereto in the same manner as the first column. That is, the first-row third-column X-touch electrode X-TE13 is connected to the first X-touch line X-TL1, and the third-row third-column X-touch electrode X-TE33 is connected to the third X-touch line X-TL3. On the other hand, the second-row third-column X-touch electrode X-TE23 and the fourth-row third-column X-touch electrode X-TE43 are not directly connected to any X-touch line X-TL.

Similarly, for X-touch electrodes X-TE14, X-TE24, X-TE34 and X-TE44 disposed in the fourth column, X-touch lines X-TL may be connected thereto in the same manner as the second column. That is, the second-row fourth-column X-touch electrode X-TE24 is connected to the second X-touch line X-TL2, and the fourth-row fourth-column X-touch electrode X-TE44 is connected to the fourth X-touch line X-TL4. On the other hand, the first-row fourth-column X-touch electrode X-TE14 and the third-row fourth-column X-touch electrode X-TE34 are not directly connected to any X-touch line X-TL.

Thus, it may be possible to reduce the number of touch lines TL and to secure a desired area of the touch electrode TE through a multi-feeding structure in which the touch lines TL are alternately arranged, and a touch signal is simultaneously applied to X-touch electrodes X-TE disposed in the same row. As a result, an enhancement in touch sensing performance may be achieved.

Although the multi-feeding structure, in which touch lines TL are alternately arranged on a two-line basis, and a touch signal is simultaneously applied to X-touch electrodes X-TE disposed in the same row, has been illustratively described in the above description, it may be possible to implement a multi-feeding structure in which touch lines TL are alternately arranged on an N-line basis (N being a natural number equal to or greater than 2), and a touch signal is simultaneously applied to X-touch electrodes X-TE disposed in the same row.

Meanwhile, in the touch display device 100 according to the example embodiment of the disclosure, the X-touch electrodes X-TE may have the same shape. However, a part of the X-touch electrodes X-TE may have a shape different from that of the remaining part of the X-touch electrodes X-TE.

Figure 6A:
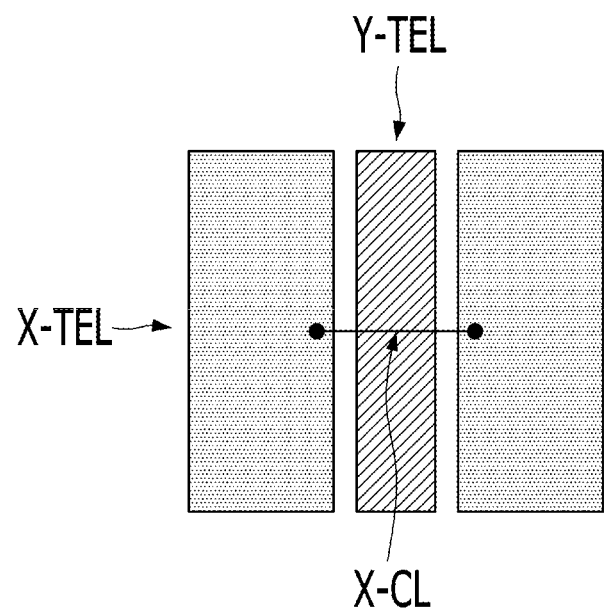
FIGS. 6A and 6B are views illustratively showing various structures of a touch electrode line in a touch display device according to an example embodiment of the disclosure.
Figure 6B:
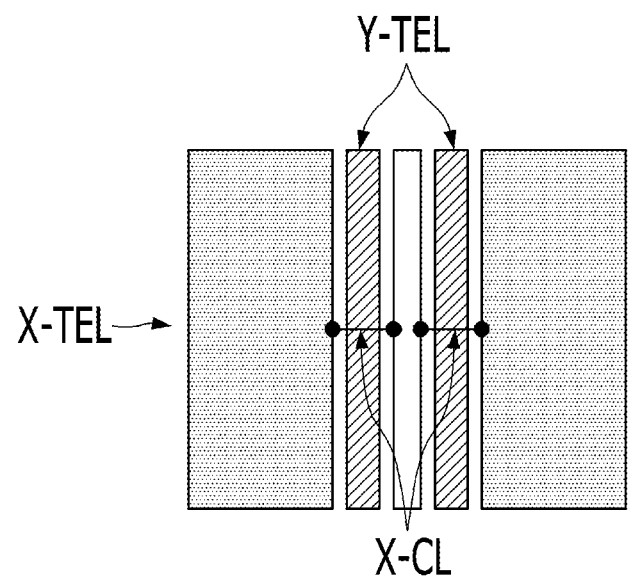

FIGS. 6A and 6B are views illustratively showing various structures of a touch electrode line in a touch display device according to an example embodiment of the disclosure.

Referring to FIGS. 6A and 6B, a touch display device 100 according to an example embodiment of the disclosure may be constituted by touch electrode lines X-TEL and Y-TEL having various structures.

For example, in the touch display device 100 according to the example embodiment of the disclosure, as shown in FIG. 6A, an X-touch electrode line X-TEL may be constituted by X-touch electrodes X-TE having the same shape while being disposed at opposite sides in an x-axis direction with reference to a Y-touch electrode line Y-TEL having a single bar structure extending in a y-axis direction.

Alternatively, as shown in FIG. 6B, a Y-touch electrode line Y-TEL constituted by two bars, under the condition that an X-touch electrode having a thin structure is interposed between the two bars, may be formed to have a split structure, and an X-touch electrode line X-TEL may be constituted by X-touch electrodes X-TE having the same shape while being disposed at opposite sides in the x-axis direction with reference to the Y-touch electrode line Y-TEL constituted by the double-bar structure, and X-touch electrode X-TE having a thin structure while being interposed between the two bars of the Y-touch electrode line Y-TEL.

In either case, portions of the X-touch electrode line X-TEL separated by the Y-touch electrode line Y-TEL may be interconnected via an X-touch electrode connection line X-CL.

Meanwhile, the area of the X-touch electrode line X-TEL, to which a touch driving signal TDS is applied, and the area of the Y-touch electrode line Y-TEL, to which a touch sensing signal is transmitted, may be equal to or different from each other.

For example, when it is desired to relatively reduce parasitic capacitance caused by the Y-touch electrode line Y-TEL, to which a touch sensing signal TSS is transmitted, the Y-touch electrode line Y-TEL may be formed to have a smaller area than the X-touch electrode line X-TEL. In this case, the area of the X-touch electrode line X-TEL, to which a touch driving signal TDS is applied, and the area of the Y-touch electrode line Y-TEL, to which a touch sensing signal TSS is transmitted, may be determined to have a ratio of 5:1 to 2:1. For example, the area of the X-touch electrode line X-TEL and the area of the Y-touch electrode line Y-TEL may be determined to have a ratio of 4:1.

Structures of the touch electrode lines X-TEL and Y-TEL as described above may be diversely varied in accordance with the size or application of the touch display device 100.

Meanwhile, an X-touch line X-TL electrically connected to the X-touch electrode line X-TEL may be formed at a position spaced apart from the Y-touch electrode line Y-TEL by a selected distance (or in some embodiments, predetermined distance).

Figure 7:
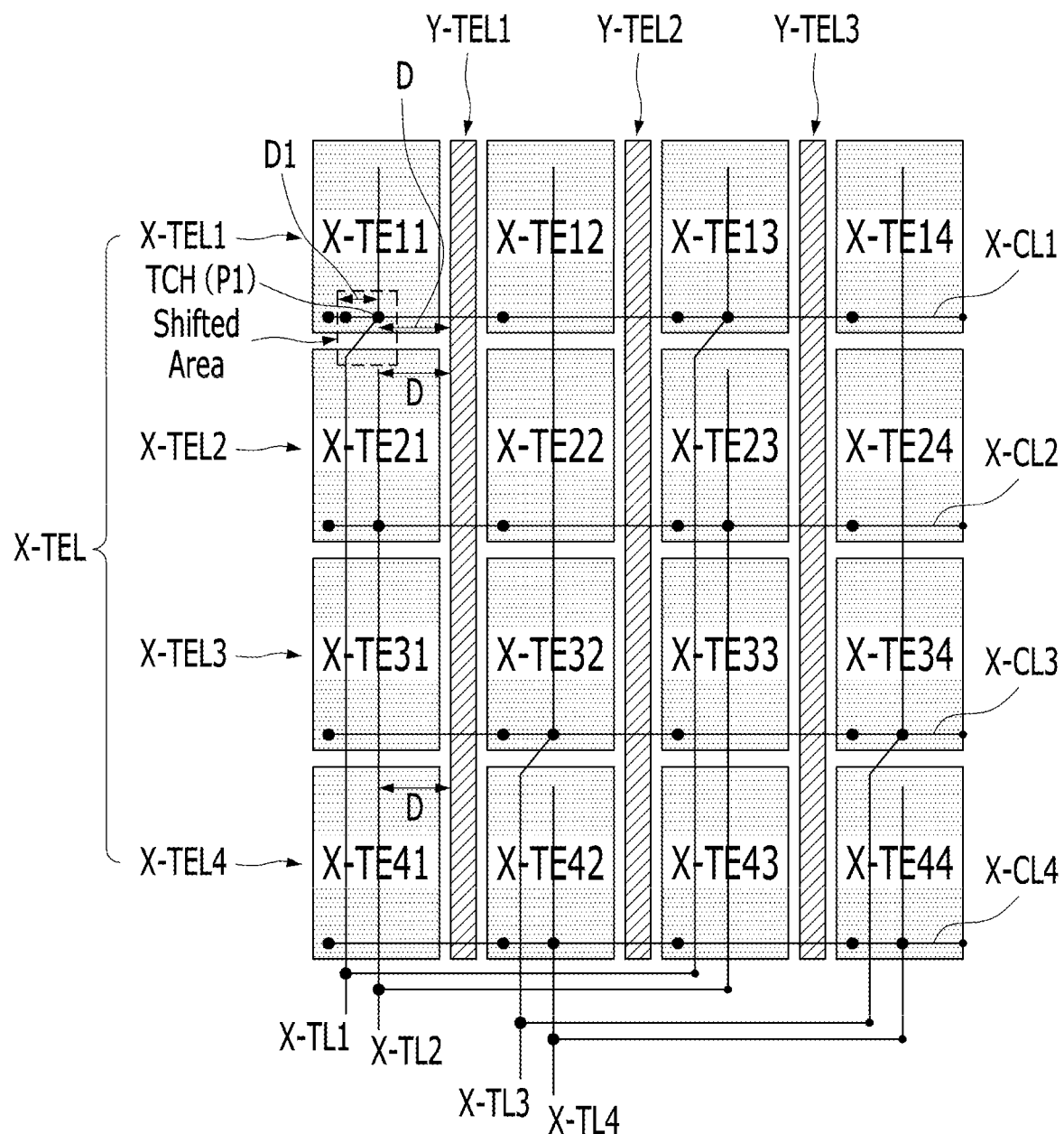
FIG. 7 is a view illustratively showing a distance between a touch line, to which a touch driving signal is applied, and a touch sensing electrode line, to which a touch sensing signal is transmitted, in a touch display device.

FIG. 7 is a view illustratively showing a distance between a touch line, to which a touch driving signal TDS is applied, and a touch sensing electrode line, to which a touch sensing signal TSS is transmitted, in a touch display device.

FIG. 7 shows the case in which each of the x-axis directional X-touch electrode lines X-TEL1, X-TEL2, X-TEL3 and X-TEL4 is constituted by a plurality of X-touch electrodes X-TE each corresponding to a touch driving electrode, and each of the y-axis directional Y-touch electrode lines Y-TEL1, Y_TEL2 and Y_TEL3 is constituted by one Y-touch electrode Y-TE corresponding to a touch sensing electrode.

In this case, a touch driving signal TDS is applied to the first X-touch electrode line X-TEL1 disposed in a first row via a first X-touch line X-TL1, and a touch driving signal TDS is applied to the second X-touch electrode line X-TEL2 disposed in a second row via a second X-touch line X-TL2.

When each X-touch line X-TL is linearly formed in this structure, a distance D between the y-touch electrode line Y-TEL corresponding to a touch sensing electrode and the X-touch line X-TL may be varied in accordance with a position of the X-touch electrode line X-TEL due to a position of a contact hole to which the X-touch line X-TL and the X-touch electrode line X-TEL are connected.

As a result, even when touch is generated at an X-touch electrode X-TE of a particular position, parasitic capacitance may be generated due to another X-touch line X-TL passing by the particular X-touch electrode X-TE, and a parasitic capacitance deviation may be generated due to a distance difference of the X-touch lines X-TL from the Y-touch electrode line Y-TEL. As such, touch performance may be degraded.

In particular, such a phenomenon may be further greatly exhibited in a multi-touch case in which a plurality of fingers simultaneously touches on a plurality of X-touch electrodes.

In particular, since a greater number of X-touch lines X-TL may be arranged at a position nearer to a touch driving circuit 150, parasitic capacitance formed between the X-touch line X-TL and the Y-touch electrode line Y-TEL may further increase at a position nearer to the touch driving circuit 150 in this case.

As a result, when touch lines TL are formed to have a multi-feeding structure in order to simultaneously apply a touch driving signal TDS to a plurality of touch driving electrodes constituting an X-touch electrode line X-TEL, there may be degradation in touch performance and difficulty in discriminating a correct touch position due to parasitic capacitance formed between an X-touch line X-TL and a Y-touch electrode line Y-TEL.

In order to solve this problem, the Y-touch electrode line Y-TEL corresponding to a touch sensing electrode and the X-touch line X-TL corresponding to a touch driving line may be formed such that the distance D therebetween is uniform, for a reduction in deviation of the parasitic capacitance formed between the X-touch line X-TL and the Y-touch electrode line Y-TEL.

Accordingly, in some embodiments, the X-touch line X-TL extending in the y-axis direction may be formed to have a structure in which the X-touch line X-TL is shifted toward the Y-touch electrode line Y-TEL through a shifted area SA. The shifted area SA may be located between adjacent touch electrodes (e.g., between X-TE11 and X-TE21, between X-TE32 and X-TE42, between X-TE13 and X-TE23, and between X-TE34 and X-TE44 as shown in FIG. 7).

Referring to FIG. 7, in the display device 100 according to the example embodiment of the disclosure, a display panel 110 may include an X-touch electrode line X-TEL constituted by a plurality of X-touch electrodes X-TE arranged in the x-axis direction and configured to simultaneously apply a touch driving signal TDS to the plurality of X-touch electrodes, Y-touch electrode lines Y-TEL extending in the y-axis direction while being configured to receive a touch sensing signal TSS, and a plurality of X-touch lines X-TL each extending in the y-axis direction while being electrically connected to a designated one of the X-touch electrodes X-TE via a touch contact hole TCH and configured to transmit the touch driving signal TDS to the designated X-touch electrode X-TE. The plurality of X-touch lines X-TL may be disposed such that a distance D between the X-touch line X-TL electrically connected to the designated X-touch electrode X-TE and the Y-touch electrode line Y-TEL adjacent to the touch contact hole TCH connected to the designated X-touch electrode X-TE is uniform.

For example, a second X-touch line X-TL2 nearest to a left side of a first Y-touch electrode line Y-TEL1 from among the plurality of X-touch lines X-TL may be electrically connected to a second X-touch electrode line X-TEL2 via a touch contact hole TCH at a position spaced apart from the first Y-touch electrode line Y-TEL1 by a selected distance (or in some embodiments, predetermined distance) D. Accordingly, the distance between the second X-touch line X-TL2 connected to the second X-touch electrode line X-TEL2 and the first y-touch electrode line Y-TEL1 may be D.

The second X-touch line X-TL2 may extend only to a touch contact hole TCH electrically connected to the second X-touch electrode line X-TEL2 because the second X-touch line X-TL2 is electrically connected to the second X-touch electrode line X-TEL2 via the touch contact hole TCH.

On the other hand, a first X-touch line X-TL1 is formed to be shifted toward the first Y-touch electrode line Y-TEL1 by a selected distance D1 (or in some embodiments, predetermined distance) in a shifted area SA.

In this case, the shifted distance of the first X-touch line X-TL1 in the shifted area SA may correspond to the distance D1 between the first X-touch line X-TL1 and the second X-touch line X-TL2. Accordingly, the position of the first X-touch line X-TL1 shifted in the shifted area corresponds to a point P1 of the first X-touch line X-TL1 spaced apart from the first Y-touch electrode line Y-TEL1 by the distance D. As a result, a point P1 where the first X-touch line X-TL1 is connected to the first X-touch electrode line X-TEL1 corresponds to the point of the first X-touch line X-TL1 spaced apart from the first Y-touch electrode line Y-TEL1 by the distance D, similarly to the case of the second X-touch line X-TL2.

Similarly, the first X-touch line X-TL1 may be disposed such that the first X-touch line X-TL1 extends only to a touch contact hole TCH electrically connected to the first X-touch electrode line X-TEL1 and, as such, the first X-touch line X-TL1 may extend only to a shifted area SA of the first X-touch electrode line X-TEL1.

Thus, the X-touch lines X-TL respectively connected to the X-touch electrode lines X-TEL may be sequentially shifted in respective shifted areas of the X-touch electrode lines X-TEL and, as such, may be arranged such that points of the X-touch lines X-TL electrically connected to the X-touch electrode lines X-TEL via touch contact holes TCH are spaced apart from corresponding ones of the Y-touch electrode lines Y-TEL by a uniform distance D, respectively.

In this case, the shifted area in which the X-touch line X-TL is formed to have a shifted structure may correspond to an edge area of the X-touch electrode line X-TEL, for uniform disposition of the X-touch line X-TL with respect to the Y-touch electrode line Y-TEL. For example, when the touch driving circuit 150 is disposed at a lower portion of the display panel 110, the X-touch line X-TL extends upwards from the lower portion of the display panel 110 and, as such, the shifted area in which the X-touch line X-TL is formed to have a shifted structure may correspond to a lower edge area of the X-touch electrode line X-TEL.

In addition, portions of the X-touch electrode line X-TEL disposed at opposite sides of the Y-touch electrode line Y-TEL may be interconnected via the X-touch electrode connection line X-CL. In this case, a point where the X-touch electrode line X-TEL is connected to the X-touch electrode connection line X-CL may correspond to a touch contact hole TCH where the X-touch line X-TL and the X-touch electrode line X-TEL are electrically interconnected. In this case, the X-touch electrode connection line X-CL, which interconnects the portions of the X-touch electrode line X-TEL disposed at opposite sides of the Y-touch electrode line Y-TEL, and the X-touch line X-TL electrically connected to the X-touch electrode line X-TEL may be interconnected by one touch contact hole TCH.

In addition, for uniform disposition of the X-touch line X-TL with respect to the Y-touch electrode line Y-TEL, it is beneficial that the X-touch line X-TL be formed symmetrically with the Y-touch electrode line Y-TEL with reference to the touch contact hole TCH connected to the X-touch electrode connection line X-CL.

In this case, under the condition that the Y-touch electrode line Y-TEL corresponding to a touch sensing electrode and the X-touch line X-TL corresponding to a touch driving line are formed such that the distance D therebetween is uniform, a direction that the X-touch line X-TL is shifted in a shifted area may be a horizontal direction or may be a diagonal direction.

When X-touch lines X-TL each having a shifted area are alternately arranged, it may be possible to reduce the number of touch lines TL and to uniformly distribute a capacitance between X-touch lines X-TL and Y-touch electrode lines Y-TEL. Accordingly, an enhancement in touch sensing performance may be achieved.

In the above-description, the case of a touch electrode structure in a 4×4 matrix, that is, the case in which two X-touch lines X-TL are disposed at each of left and right sides of a Y-touch electrode line Y-TEL, has been illustratively described. However, when the number of touch electrodes increases, the number of X-touch lines X-TL disposed at each of the left and right sides of the Y-touch electrode line Y-TEL may be correspondingly increased.

Meanwhile, the touch electrode lines X-TEL and Y-TEL included in the touch display device 100 may be constituted by a plate type touch electrode metal having no opening or a mesh type touch electrode metal having an opening for desired luminous efficacy of sub-pixels SP.

Figure 8:
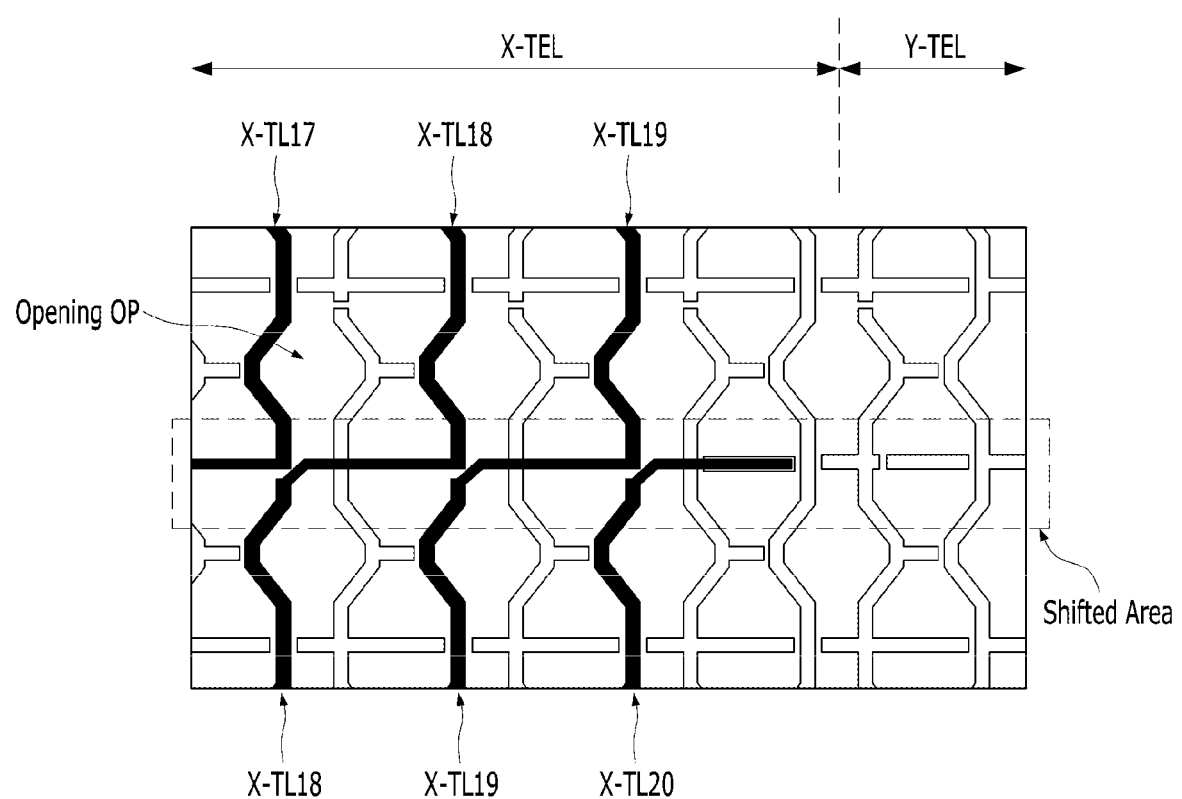
FIG. 8 is a view illustratively showing a touch line in a shifted area in the case in which a touch electrode line is constituted by a mesh type touch electrode metal in a touch display device according to an example embodiment of the disclosure.

FIG. 8 is a view illustratively showing a touch line in a shifted area in the case in which a touch electrode line is constituted by a mesh type touch electrode metal in a touch display device according to an example embodiment of the disclosure.

Referring to FIG. 8, in a touch display device 100 according to an example embodiment of the disclosure, an X-touch electrode line X-TEL, to which a touch driving signal TDS is applied, and a Y-touch electrode line Y-TEL, to which a touch sensing signal TSS is transmitted, may be constituted by a mesh type touch electrode metal having an opening OP.

In this case, each of the touch electrode lines X-TEL and Y-TEL may extend to have repeated structures each having an opening at a central portion thereof and a touch electrode metal at least partially surrounding the opening. Here, the case in which the touch electrode metal surrounding the opening has an octagonal-like shape is illustratively shown.

X-touch lines X-TL, which apply a touch driving signal TDS, may extend along a touch electrode metal constituting an X-touch electrode line X-TEL, and a designated one of the X-touch lines X-TL may be electrically connected to a X-touch electrode line X-TEL corresponding thereto via a touch contact hole TCH at a position where the X-touch line X-TL is spaced apart from a Y-touch electrode line Y-TEL by a selected distance (or in some embodiments, predetermined distance) D.

Meanwhile, the touch electrode lines X-TEL and Y-TEL may be constituted by a transparent electrode or may include a transparent electrode, for desired luminous efficacy of sub-pixels SP.

Figure 9B:
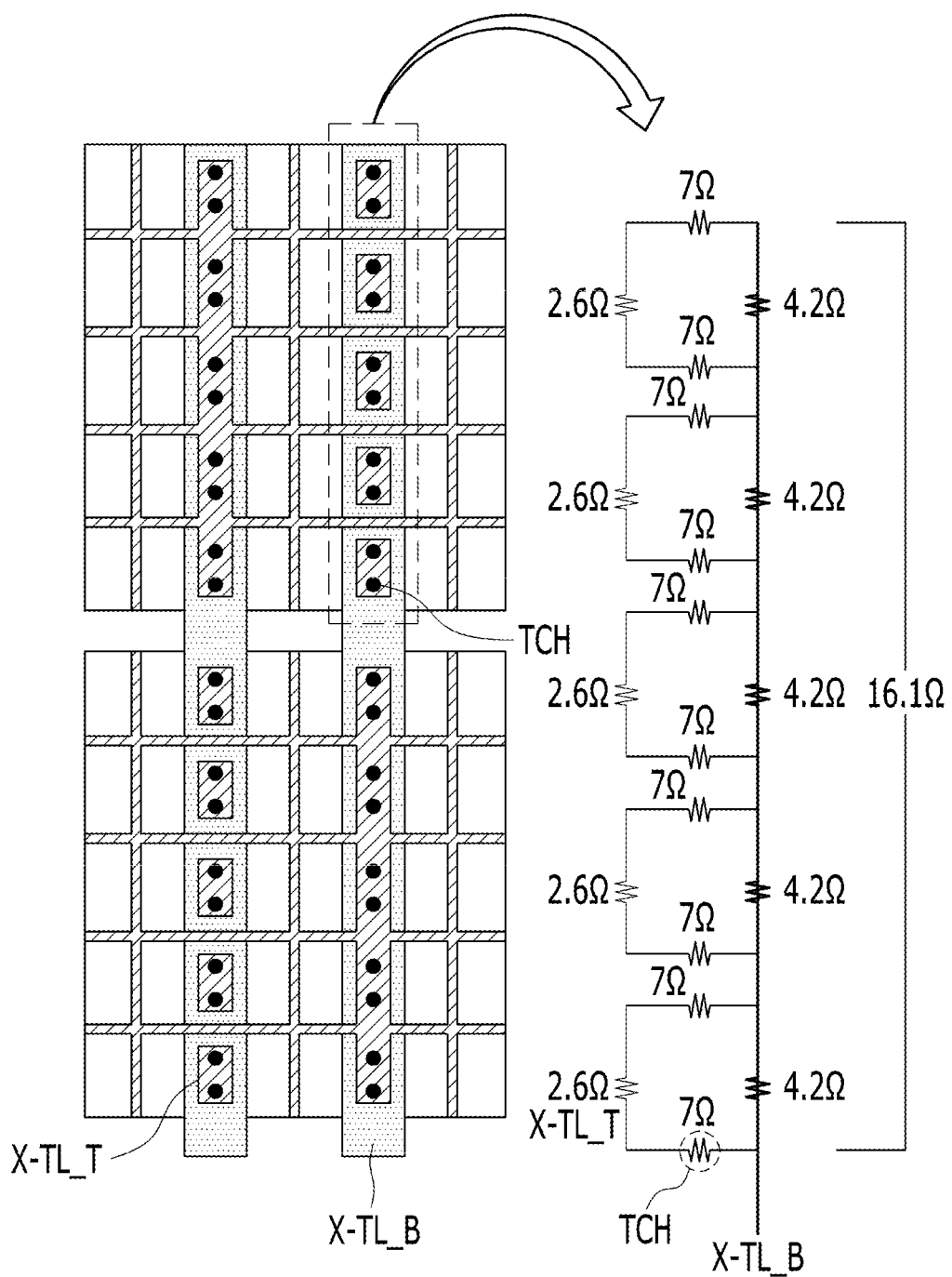
FIGS. 9B and 9C are enlarged views of a dotted area in FIG. 9A.
Figure 9C:
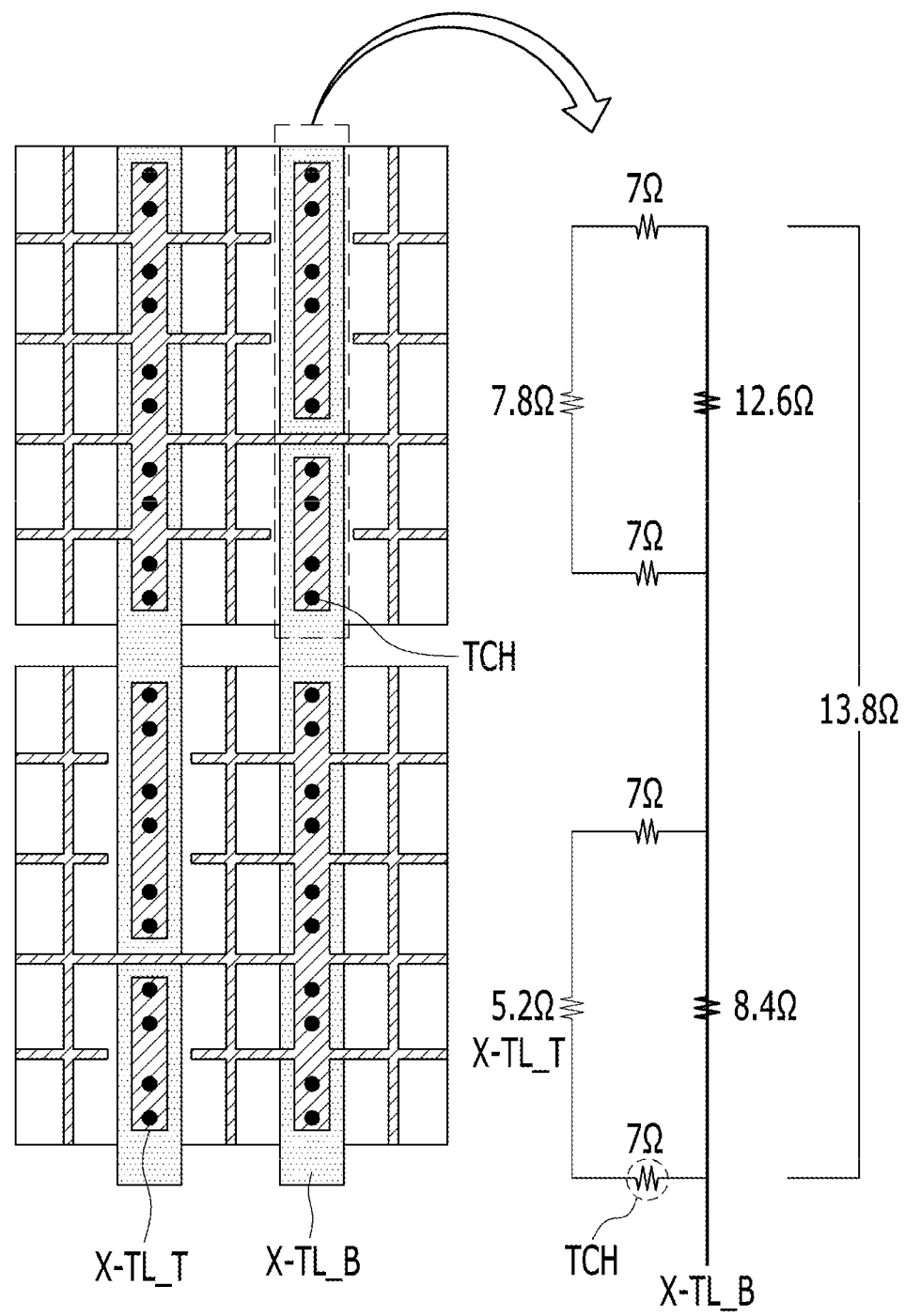

FIG. 9A is a view illustratively showing connection of an X-touch line formed to have a double line structure in a touch display device. FIGS. 9B and 9C are enlarged views of a dotted area in FIG. 9A.

Referring to FIGS. 9A to 9C, the case in which x-axis directional X-touch electrode lines X-TEL are each constituted by a plurality of X-touch electrodes, and y-axis directional Y-touch electrode lines Y-TEL are each constituted by one Y-touch electrode is illustratively shown. In this case, when a plurality of X-touch electrodes arranged in the x-axis direction constitutes one X-touch electrode line X-TEL, the plurality of X-touch electrodes constituting one X-touch electrode line X-TEL may be interconnected by an X-touch electrode connection line X-CL such that a touch signal is simultaneously applied to the plurality of X-touch electrodes, and a plurality of X-touch electrodes disposed on the same line may be interconnected by the same X-touch line X-TL.

The X-touch line X-TL may be electrically connected to each X-touch electrode via a touch contact hole TCH. In this case, when the X-touch electrode line X-TEL is formed of a mesh type touch electrode metal, the X-touch electrode may be a mesh type X-touch electrode line X-TEL. In this case, meshes of the X-touch electrode may be formed to have a spacing corresponding to a unit pixel distance.

In addition, the X-touch line X-TL may be constituted by a double line structure of a top X-touch line X-TL_T and a bottom X-touch line X-TL_B in order to reduce line resistance. For example, in the case in which the X-touch line X-TL is formed to have a single line structure, the line resistance in one touch electrode area may be 21Ω when the X-touch line X-TL has a resistance value of about 4.2Ω for one unit pixel distance. Accordingly, when the X-touch line X-TL is formed to have a double line structure such that a top X-touch line X-TL_T and a bottom X-touch line X-TL_B are configured to have a parallel structure (that overlaps each other vertically when seen from a plan view), the line resistance of the X-touch line X-TL may be reduced. In this case, the top X-touch line X-TL_T and the bottom X-touch line X-TL_B may be electrically interconnected by a touch contact hole TCH.

The top X-touch line X-TL_T may be formed of the same material as that of the X-touch electrode line X-TEL. The top X-touch line X-TL_T may be formed on the same layer as the X-touch electrode line X-TEL. In addition, the bottom X-touch line X-TL_B may be formed of the same material as that of a Y-touch electrode line Y-TEL. The bottom X-touch line X-TL_B may be formed on the same layer as the Y-touch electrode line Y-TEL.

In addition, since the X-touch electrode line X-TEL may be a mesh type X-touch electrode line X-TEL, the X-touch electrode X-TE may be directly and electrically connected to the top X-touch line X-TL_T when the X-touch electrode X-TE is formed on the same layer the top X-touch line X-TL_T.

Referring to FIGS. 9A to 9C, the X-touch line X-TL may be configured to have a multi-feeding structure such that a touch signal is simultaneously applied to a plurality of touch electrodes TE constituting the same X-touch electrode line X-TEL.

Accordingly, one X-touch line XL may be electrically connected to one of a plurality of X-touch electrodes X-TE arranged in the y-axis direction, and may not be electrically connected to the remaining X-touch electrodes X-TE respectively corresponding to different X-touch electrode lines X-TEL.

In other words, in a touch electrode area in which the X-touch line X-TL and the X-touch electrode X-TE are not electrically interconnected, the X-touch electrode line X-TEL may be formed to have an opened structure on a unit pixel basis, and the top X-touch line X-TL_T and the X-touch electrode line X-TEL are spaced apart from each other.

Accordingly, in the X-touch line X-TL formed to have a double line structure, the top X-touch line X-TL_T is formed on the same layer as the X-touch electrode line X-TEL, and the bottom X-touch line X-TL_B is formed on a layer different from that of the X-touch electrode line X-TEL and, as such, the top X-touch line X-TL_T may be formed to be opened at least one time without continuously extending in the y-axis direction, and the bottom X-touch line X-TL_B may be formed to continuously extend in the y-axis direction.

Referring to FIGS. 9B and 9C, there may be an influence of the resistance value of the touch contact hole TCH in accordance with a double line structure. For example, in the double line structure shown in FIG. 9B, when the resistance value of the top X-touch line X-TL_T is 2.6Ω per unit pixel distance, the resistance value of the bottom X-touch line X-TL_B is 4.2Ω per unit pixel distance, and the resistance value of the touch contact hole TCH is 7Ω per unit pixel distance, the line resistance of the X-touch line X-TL in one touch electrode area may be about 16.1Ω. In other words, since the top X-touch line X-TL_T is opened in the y-axis direction on a unit pixel basis, the resistance value of the touch contact hole TCH is greater than the resistance value of the top X-touch line X-TL_T and, as such, the line resistance of the X-touch line X-TL may be greatly influenced by the resistance value of the touch contact hole TCH.

In the double line structure shown in FIG. 9C, the top X-touch line X-TL_T has a structure in which the top X-touch line X-TL_T is not opened on a unit pixel basis, but is opened only one time in one touch electrode area and, as such, it may be possible to reduce the line resistance of the X-touch line X-TL. In this case, the line resistance of the X-touch line X-TL is 13.8Ω and, as such, it may be possible to further reduce the line resistance, as compared to the structure of FIG. 9B. Although the top X-touch line X-TL_T is shown in FIG. 9C as being opened only one time in one touch electrode area, the example embodiments of the disclosure are not limited thereto. The top X-touch line X-TL_T may have a structure in which the top X-touch line X-TL_T is opened one or more times in one touch electrode area so as to reduce an influence of the resistance value of the touch contact hole TCH.

Thus, the touch display device 100 according to the example embodiment of the disclosure may reduce the line resistance of the X-touch line X-TL during multi-feeding in which a touch signal is simultaneously applied to X-touch electrodes X-TE disposed in the same row and, as such, may achieve an enhancement in touch sensing performance.

Figure 10:
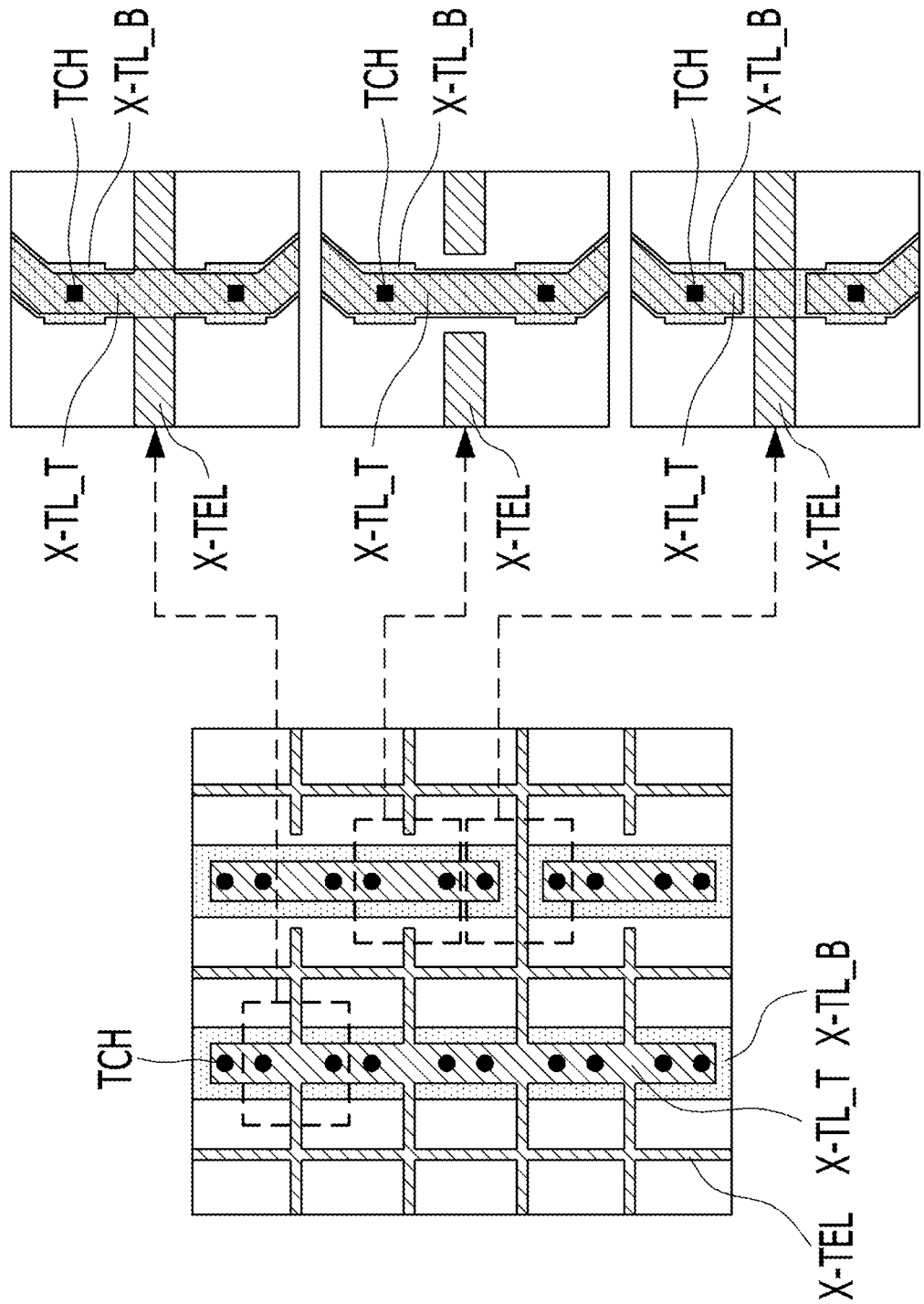
FIG. 10 is a plan view illustrating touch contact holes for some parts in a touch display device according to an example embodiment of the disclosure.

FIG. 10 is a plan view illustrating touch contact holes for some parts in a touch display device according to an example embodiment of the disclosure.

As shown in FIG. 10, for each X-touch line, a width of the top X-touch line X-TL_T may be narrower than that of the bottom X-touch line X-TL_B at their overlapping portion. Or the bottom X-touch line X-TL_B may be narrower than that of the width of the top X-touch line X-TL_T at their overlapping portion. At least one of the X-touch line and the bottom X-touch line may have a partially curved portion.

The X-touch electrode line X-TEL may be formed of a mesh-type touch electrode metal. The X-touch electrode line X-TEL may be a discontinuous grid at some portions.

Figure 11A:
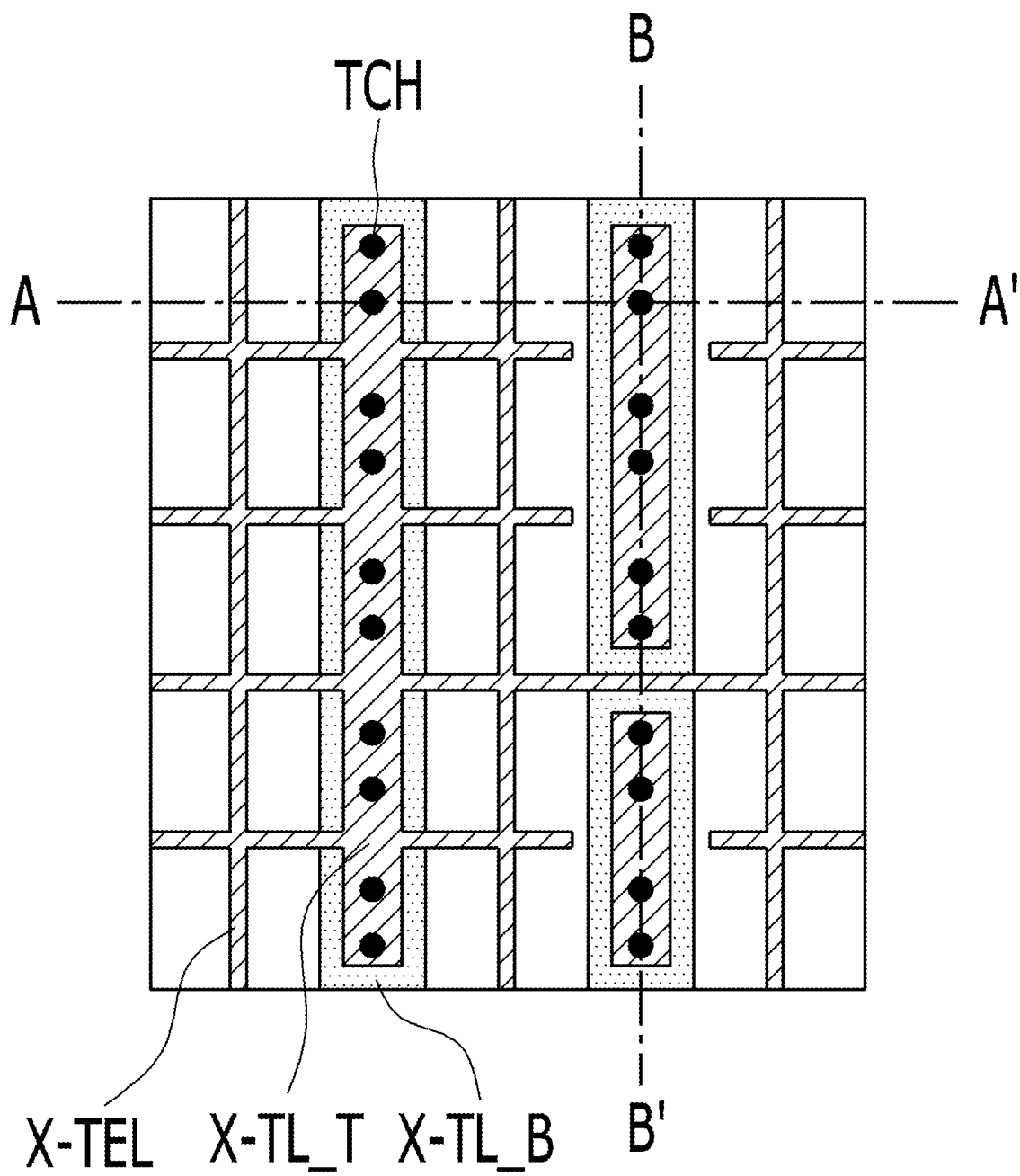
FIG. 11A is a plan view illustrating a touch display device according to an example embodiment of the disclosure.
Figure 11B:
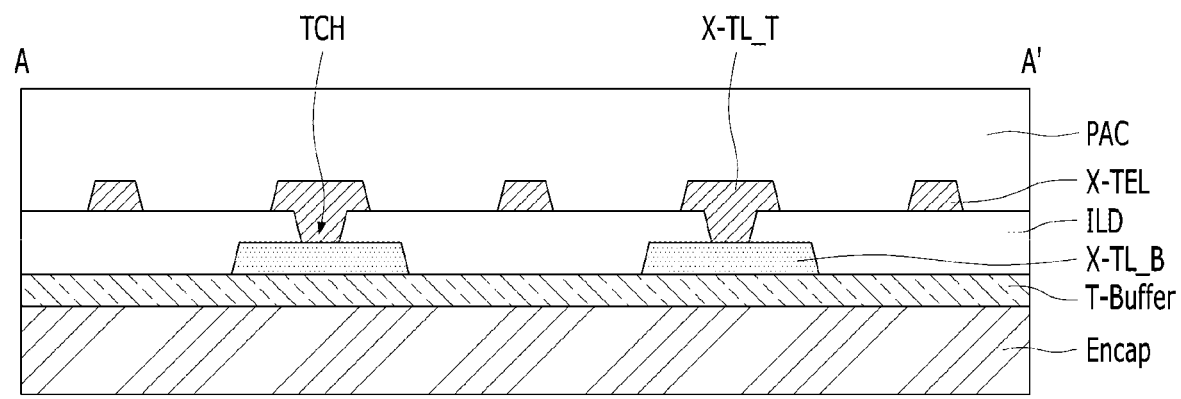
FIG. 11B is a cross-sectional view along line A-A' of FIG. 11A.
Figure 11C:
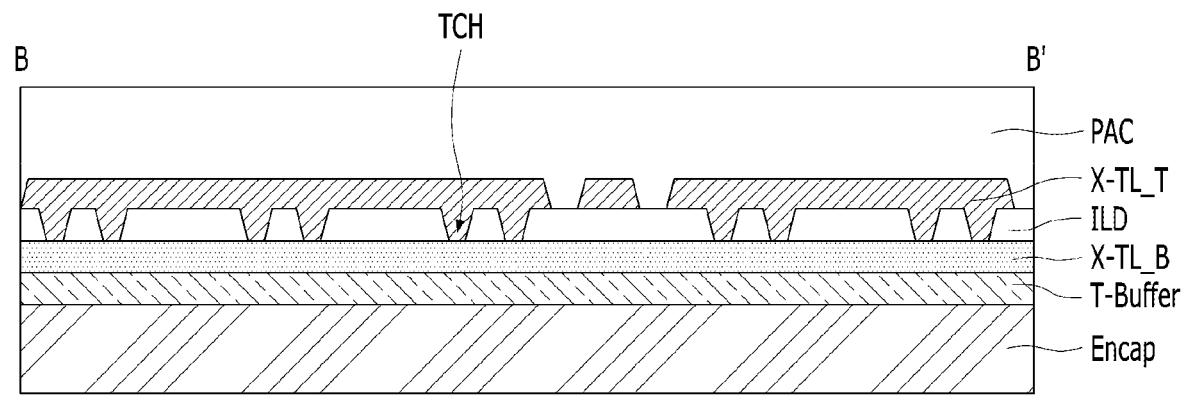
FIG. 11C is a cross-sectional view along line B-B' of FIG. 11B.

The top X-touch line X-TL_T and the X-touch electrode line X-TEL may be formed at a same layer. The top X-touch line X-TL_T and the X-touch electrode line X-TEL may be integrally connected at the same layer. In order to distinguish electrical signals between adjacent X-touch lines, the X-touch electrode line X-TEL which is connected to the top X-touch line X-TL_T of one X-touch line, is spaced apart from adjacent top X-touch line X-TL_T. The X-touch electrode line X-TEL may pass through an open region of the top X-touch lines X-TL_T between adjacent X-touch lines FIG. 11A is a plan view illustrating a touch display device according to an example embodiment of the disclosure. FIG. 11B is a cross-sectional view along line A-A' of FIG. 11A. FIG. 11C is a cross-sectional view along line B-B' of FIG. 11B.

As shown in FIGS. 11A to 11C, a touch display device according to an example embodiment of the disclosure may include a touch buffer layer T-Buffer on the encapsulation layer Encap.

A bottom X-touch line X-TL_B may be formed on the touch buffer layer T-Buffer along the Y-axis direction. The bottom X-touch line X-TL_B may be formed in a single layer or multi-layer structure. The bottom X-touch line X-TL_B may be formed of metal having strong corrosion resistance, strong acid resistance, and excellent conductivity. Example of such materials include, but are not limited to, Al, Ti, Cu, or Mo. The bottom X-touch line X-TL_B may comprise a transparent oxide conductive layer such as Indium-Tin Oxide ITO or Indium-Zinc Oxide IZO. Also, the bottom X-touch line X-TL_B may comprise a metal having strong shielding property against hydrogen or moisture.

An interlayer dielectric material ILD may be formed to overlay the bottom X-touch line X-TL_B.

The interlayer dielectric material ILD may include the touch contact hole TCH to expose a part of the bottom X-touch line X-TL_B.

The top X-touch line X-TL_T may be formed on the interlayer dielectric material ILD to overlap the bottom X-touch line X-TL_B. The top X-touch line X-TL_T can be electrically connected to the bottom X-touch line X-TL_B through the touch contact hole TCH in the interlayer dielectric material ILD.

One bottom X-touch line X-TL_B and one top X-touch line X-TL_T are connected through the touch contact hole TCH, and the connected bottom X-touch line X-TL_B and the top X-touch line X-TL_T constitute one touch line.

The X-touch electrode line X-TEL can be located on a same layer as the top X-touch line X-TL_T. One X-touch line may be connected to the one X-touch electrode line X-TEL in a one-to-one correspondence. When one X-touch electrode line X-TEL is integrally connected to one top X-touch line X-TL_T, the one X-touch electrode may not connect with an adjacent top X-touch line X-TL_T. The top X-touch line X-TL_T may be formed in a single layer or multi-layer structure. The top X-touch line X-TL_T may be formed of metal having strong corrosion resistance, strong acid resistance and excellent conductivity, such as Al, Ti, Cu, or Mo. The top X-touch line X-TL_T may comprise a transparent oxide conductive layer such as Indium-Tin Oxide ITO or Indium-Zinc Oxide IZO. The top X-touch line X-TL_T may comprise a metal having strong shielding property against hydrogen or moisture.

A touch display device according to an example embodiment of the disclosure may include a touch protective layer PAC to overlay the top X-touch-line X-TL_T and the interlayer dielectric material ILD.

In the above description, a connection between the X-touch electrode line X-TEL and the X-touch line is described. A touch display device according to an example embodiment of the disclosure may include a connection between a Y-touch electrode line and a Y-touch line similar or identical as described above.

As apparent from the above description, in accordance with the example embodiments of the disclosure, it may be possible to provide a touch display device capable of reducing the line resistance of a touch line, thereby achieving an enhancement in touch sensing performance.

While the embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation. Therefore, the foregoing embodiments disclosed herein shall be interpreted as illustrative only but not as limitative of the principle and scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
    a plurality of X-touch electrode lines extending in a first direction and receiving a touch driving signal, each of the X-touch electrode lines having a plurality of X-touch electrodes arranged in the first direction,
    a plurality of Y-touch electrode lines extending in a second direction and transmitting a touch sensing signal;
    a plurality of X-touch lines transmitting the touch driving signal, the plurality of X-touch lines including a double line structure having a top X-touch line and a bottom X-touch line;
    at least one of the X-touch electrodes and a Y-touch electrode defining a touch electrode area; and
    a plurality of touch contact holes electrically connecting the plurality of X-touch lines and the plurality of X-touch electrode lines to a plurality of X-touch electrodes.

2. The touch display device according to claim 1, wherein at least one X-touch electrode line of the plurality of X-touch electrode lines has a curved shaped at the touch electrode area.

3. The touch display device according to claim 2, wherein adjacent X-touch lines of the plurality of X-touch lines have different resistances corresponding to one touch electrode area.

4. The touch display device according to claim 2, wherein X-touch lines of the plurality of X-touch lines have at least 2 linear portions to form the curved shaped at the touch electrode area.

5. The touch display device according to claim 1, wherein each of the X-touch electrode lines includes touch electrode metal of a mesh type.

6. The touch display device according to claim 5, wherein the touch electrode metal of a mesh type includes at least one portion that is electrically and physically disconnected from the mesh.

7. The touch display device according to claim 1, wherein the top X-touch line and the bottom X-touch line are electrically interconnected via the plurality of touch contact holes.

8. The touch display device according to claim 7, wherein the top X-touch line is disposed at a same layer as the X-touch electrode lines.

9. The touch display device according to claim 7, wherein the bottom X-touch line is disposed at a same layer as the Y-touch electrode lines.

10. The touch display device according to claim 1,
wherein at least one of the plurality of X-touch electrode lines extends continuously in the first direction in one touch electrode area, and
wherein the plurality of touch contact holes are arranged in the second direction.

11. Touch display device according to claim 10,
wherein adjacent touch contact holes of the plurality of touch contact holes are symmetrically arranged with respect to at least one of the plurality of X-touch electrode lines.

12. The touch display device according to claim 7, wherein at least one of the plurality of X-touch electrode lines is provided with a first open area in the first direction in one touch electrode area and the at least one of the plurality of X-touch electrode lines does not overlap with the top X-touch line.

13. The touch display device according to claim 12, wherein the at least one of the plurality of X-touch electrode lines is provided with the bottom X-touch line in the first open area in the first direction and the at least one of the plurality of X-touch electrode lines does not overlap with the top X-touch line.

14. The touch display device according to claim 7, wherein the top X-touch line is formed to be spaced at least one time in the second direction in one touch electrode area and the upper X-touch line does not overlap with the X-touch electrode line.

15. The touch display device according to claim 7, wherein the bottom X-touch line extends continuously and contiguously in the second direction.

16. The touch display device according to claim 1, wherein the plurality of touch contact holes is disposed at opposite areas with reference to the plurality of Y-touch electrode lines and are misaligned from one another.

17. The touch display device according to claim 1, wherein the plurality of touch contact holes along one of the plurality of X-touch lines has a same distance in the first direction from one of the Y-touch electrode lines adjacent thereto.

18. The touch display device according to claim 1, wherein the plurality of X-touch electrode lines include a shifted area in which the plurality of X-touch electrode lines are shifted by a selected distance.

19. The touch display device according to claim 18, wherein at least one X-touch electrode line is electrically floating at the shifted area.

20. The touch display device according to claim 18, wherein a shifted distance of the plurality of X-touch electrode lines corresponds to a distance between adjacent ones of the X-touch lines.

21. The touch display device according to claim 1, wherein the touch contact holes, at which the plurality of X-touch lines are electrically connected to designated ones of the X-touch electrodes, respectively, are electrically connected to an X-touch electrode connection line at opposite sides of the Y-touch electrode lines.

22. A touch display device comprising:
a plurality of X-touch electrode lines extending in a first direction and receiving a touch driving signal, each of the X-touch electrode lines having a plurality of X-touch electrodes arranged in the first direction,
a plurality of Y-touch electrode lines extending in a second direction and transmitting a touch sensing signal;
a plurality of X-touch lines transmitting the touch driving signal;
at least one of the X-touch electrodes and a Y-touch electrode defining a touch electrode area;
a plurality of touch contact holes electrically connecting the plurality of X-touch lines and the plurality of X-touch electrode lines to a plurality of X-touch electrodes;
a plurality of Y-touch lines extending in the second direction at a bezel area, respective Y-touch line of the plurality of Y-touch lines electrically connected to respective Y-touch electrode line of the plurality of Y-touch electrode lines;
at least one Y-touch bridge electrode at the bezel area;
wherein the at least one Y-touch bridge electrode is disposed under and overlaps a Y-touch line of the plurality of Y-touch lines in the bezel area.

23. The touch display device according to claim 22, further comprising:
a Y-touch pad;
a Y-touch bridge line; and
a touch driving circuit;
wherein a Y-touch electrode line of the plurality of Y-touch electrode lines is electrically connected to the touch driving circuit a Y-touch line Y-TL of the plurality of Y-touch lines and the Y-touch pad,
wherein at a notch area adjacent to the bezel area, the Y-touch bridge line is disposed under the Y-touch line Y-TL,
wherein the Y-touch line is electrically connected to the Y-touch pad at the notch area, and
wherein the Y-touch bridge line is electrically connected to a side surface of the Y-touch line at the notch area.

24. A touch display device comprising:
a X-touch electrode line configured to receive a touch driving signal, each of the X-touch electrode lines having a plurality of X-touch electrodes arranged in the first direction,
a Y-touch electrode line configured to transmit a touch sensing signal;
a X-touch line configured to transmit the touch driving signal, the X-touch line having a first touch line and a second touch line, the first touch line disposed over the second touch line; and
a touch contact hole disposed between the first touch line and the second touch line, the contact hole electrically connecting the first touch line and second touch line.

25. The touch display device of claim 24, wherein the second touch line has a wider width than the first touch line such that the second touch line fully overlaps the first touch line from a plan view.

* * * * *

UNITED STATES PATENT AND TRADEMARK OFFICE
CERTIFICATE OF CORRECTION

| | | |
|---|---|---|
| PATENT NO. | : 12,045,426 B2 | Page 1 of 1 |
| APPLICATION NO. | : 18/062960 | |
| DATED | : July 23, 2024 | |
| INVENTOR(S) | : Je Hyung Park | |

It is certified that error appears in the above-identified patent and that said Letters Patent is hereby corrected as shown below:

In the Claims

Column 27, Claim 11, Line 7:
"Touch display device" should read --The touch display device--.

Signed and Sealed this
Eleventh Day of February, 2025

Coke Morgan Stewart
*Acting Director of the United States Patent and Trademark Office*